US011438413B2

(12) United States Patent
Sohail et al.

(10) Patent No.: US 11,438,413 B2
(45) Date of Patent: Sep. 6, 2022

(54) INTELLIGENT DATA STORAGE AND MANAGEMENT FOR CLOUD COMPUTING

(71) Applicant: EMC IP Holding Company LLC, Hopkinton, MA (US)

(72) Inventors: Mohamed Sohail, Sheikh Zayed (EG); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 493 days.

(21) Appl. No.: 16/397,444

(22) Filed: Apr. 29, 2019

(65) Prior Publication Data

US 2020/0344299 A1 Oct. 29, 2020

(51) Int. Cl.
| | |
|---|---|
| H04L 67/1097 | (2022.01) |
| G06F 16/27 | (2019.01) |
| H04L 41/08 | (2022.01) |
| H04L 47/70 | (2022.01) |
| H04L 67/12 | (2022.01) |

(Continued)

(52) U.S. Cl.
CPC ........ H04L 67/1097 (2013.01); G06F 3/0604 (2013.01); G06F 3/067 (2013.01); G06F 9/5016 (2013.01); G06F 16/27 (2019.01); H04L 41/08 (2013.01); H04L 47/821 (2013.01); H04L 47/823 (2013.01); H04L 67/12 (2013.01); G06F 2212/26 (2013.01); G06F 2212/263 (2013.01)

(58) Field of Classification Search
CPC ............... H04L 67/1097; H04L 29/08; G06F 17/30873; G06F 15/16
See application file for complete search history.

(56) References Cited

U.S. PATENT DOCUMENTS

| | | | |
|---|---|---|---|
| 8,850,145 B1 | 9/2014 | Haase et al. | |
| 9,760,306 B1 * | 9/2017 | Bigman | G06F 3/0605 |

(Continued)

OTHER PUBLICATIONS link-labs.com, "An In-Depth Look at IoT in Agriculture & Smart Farming Solutions," https://www.link-labs.com/blog/iot-agriculture, downloaded on Apr. 25, 2019, 7 pages.

(Continued)

*Primary Examiner* — Mahran Y Abu Roumi
(74) *Attorney, Agent, or Firm* — Ryan, Mason & Lewis, LLP

(57) ABSTRACT

Systems and methods are provided for implementing an intelligent data management system for data storage and data management in a cloud computing environment. For example, a system includes an application server, a distributed data storage system, and an intelligent data management system. The application server is configured to host a data processing application. The distributed data storage system is configured to store data generated by a network of devices associated with the data processing application. The intelligent data management system is configured to manage data storage operations for storing the data generated by the network of devices in the distributed data storage system. For example, the intelligent data management system is configured to determine one or more data types of the data generated by the network of devices and select one of a plurality of repositories within the distributed data storage system to store the data based on the determined data types.

20 Claims, 11 Drawing Sheets

(51) Int. Cl.
   *G06F 9/50*   (2006.01)
   *G06F 3/06*   (2006.01)

(56) References Cited

U.S. PATENT DOCUMENTS

| | | | |
|---|---|---|---|
| 9,882,985 B1* | 1/2018 | Esam | H04L 67/1097 |
| 10,606,705 B1* | 3/2020 | Janakiraman | G06F 11/1451 |
| 2005/0071508 A1 | 3/2005 | Brown et al. | |
| 2007/0277011 A1* | 11/2007 | Tanaka | G06F 3/0635 |
| | | | 711/162 |
| 2008/0270524 A1 | 10/2008 | Gupta et al. | |
| 2010/0138682 A1* | 6/2010 | Obana | H05K 7/20836 |
| | | | 713/340 |
| 2010/0325352 A1* | 12/2010 | Schuette | G06F 3/0613 |
| | | | 711/E12.008 |
| 2011/0106904 A1* | 5/2011 | Resch | G06F 11/1076 |
| | | | 711/E12.002 |
| 2013/0297869 A1* | 11/2013 | Mills | G06F 3/0674 |
| | | | 711/112 |
| 2013/0312107 A1* | 11/2013 | Agrawal | G06F 21/6218 |
| | | | 726/26 |
| 2015/0134857 A1* | 5/2015 | Hahn | G06F 3/061 |
| | | | 710/5 |
| 2015/0143053 A1* | 5/2015 | Quimbey | G06F 12/0888 |
| | | | 711/133 |
| 2015/0365473 A1 | 12/2015 | Zuerner | |
| 2016/0212099 A1* | 7/2016 | Zou | H04L 63/0263 |
| 2016/0218751 A1* | 7/2016 | Goker | G06F 3/0619 |
| 2016/0226732 A1 | 8/2016 | Kim et al. | |
| 2016/0254963 A1* | 9/2016 | Vibhor | G06Q 10/06313 |
| | | | 709/222 |
| 2016/0373291 A1* | 12/2016 | Dornemann | H04L 67/56 |
| 2017/0068483 A1* | 3/2017 | Uchiyama | G06F 3/0608 |
| 2017/0364266 A1* | 12/2017 | Xu | G06F 3/0601 |
| 2018/0143891 A1* | 5/2018 | Polisetty | G06F 11/3006 |
| 2018/0357005 A1* | 12/2018 | Lee | G06F 16/17 |
| 2019/0026048 A1* | 1/2019 | Muehge | G06F 3/0685 |
| 2019/0042465 A1* | 2/2019 | Li | G06F 12/0246 |
| 2020/0014633 A1* | 1/2020 | You | H04L 47/824 |
| 2020/0327017 A1* | 10/2020 | Vijayan | G06F 11/1451 |
| 2020/0329368 A1* | 10/2020 | Sharma | H04W 4/70 |
| 2020/0334125 A1* | 10/2020 | Degaonkar | G06F 11/3058 |

OTHER PUBLICATIONS

IEEE, "P2413—Standard for an Architectural Framework for the Internet of Things (IoT)," https://standards.ieee.org/develop/project/2413.html, downloaded Apr. 25, 2019, 1 page.

cisco.com, "Internet of Things (IoT)," http://www.cisco.com/web/solutions/trends/iot/portfolio.html, downloaded Apr. 25, 2019, 4 pages.

ISO/IEC, "Internet of Things (IoT)," http://www.iso.org/iso/internet_of_things_report-jtc1.pdf, Preliminary Report, 2014, 16 pages.

L. Watkins et al., "A Passive Approach to Rogue Access Point Detection," Global Telecommunications Conference, IEEE GLOBECOM, Nov. 26-30, 2007, pp. 355-360.

Intel, "Quad-Core Intel Xeon Processor 3200 Series," http://www.intel.ie/content/dam/www/public/us/en/documents/specification-updates/xeon-3200specification-update.pdf, Dec. 2010, Document No. 316134-016, 70 pages.

gartner.com, "Internet of Things," http://www.gartner.com/it-glossary/internet-of-things/, 2013, 3 pages.

gartner.com, "Gartner's 2014 Hype Cycle for Emerging Technologies Maps the Journey to Digital Business," http://www.gartner.com/newsroom/id/2819918, Aug. 11, 2014, 3 pages.

GSM Association, "Understanding the Internet of Things (IoT)," http:/www.gsma.com/connectedliving/wp-content/uploads/2014/08/cl_iot_wp_07_14.pdf, Jul. 2014, 15 pages.

ABI Research, "More Than 30 Billion Devices Will Wirelessly Connect to the Internet of Everything in 2020," https://www.abiresearch.com/press/more-than-30-billion-devices-will-wirelessly-conne/, May 9, 2013, 2 pages.

IDC, "Market in a Minute: Internet of Things," http://www.idc.com/downloads/idc_market_in_a_minute_iot_infographic.pdf, 2014-2020, 2013, 1 page.

* cited by examiner

400

| User ID | Device Type | MAC Address | Device ID | VM | Storage Pool | LUN |
|---|---|---|---|---|---|---|
| U1 | Mobile | x....1 | M1 | VM1 | P1 | 100 |
| | Cooker | z....2 | C1 | VM2 | | 101 |
| | E-Curtains | y....3 | C2 | VM3 | | 102 |
| | Door | a....4 | D1 | | | 103 |
| U2 | Mobile | b....5 | M2 | VM1 | P2 | 104 |
| | Laptop | f....6 | L1 | | | 105 |
| | Cooker | i....7 | C3 | VM2 | | 106 |
| | Car | e....8 | C4 | VM4 | | 107 |

FIG. 4

INTELLIGENT DATA STORAGE AND MANAGEMENT FOR CLOUD COMPUTING

FIELD

The field relates generally to cloud computing systems and, in particular, to data storage management for cloud computing systems.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, software-as-a-service (SaaS), infrastructure-as-a-service (IaaS), and/or platform-as-a-service (PaaS). Such cloud computing services are particularly useful for implementing Internet of Things (IoT) eco-systems.

The Internet of Things is a term that refers to a network computing environment in which physical things such as devices, objects, and other things, etc., are equipped with unique identifiers, network connectivity, and other embedded technologies, which allows such devices, objects, and things to sense, communicate, interact, and send/receive data over one or more communications networks (e.g., Internet, etc.) without requiring human-to-human or human-to computer interaction. For an IoT application, a "thing" may include any object or device that can be assigned an IP address and have the capability to transfer data over a communications network. IoT technology is considered to be a key enabler for many emerging and future "smart" applications and, consequently, there is expected to be an exponential increase in the number of network connected devices, objects, and autonomous things, which are connected over a communications network such as the Internet. In this regard, as the number of network connected IoT devices increases, the Internet will become an increasingly problematic bottleneck for IoT data upload/download for IoT services, which will lead to decreased IoT network performance. Moreover, while IoT service providers typically depend on cloud computing platforms to provide IoT services, the back-end storage systems of cloud computing platforms are not optimized for IoT applications, which can further lead to degraded performance of IoT services.

SUMMARY

Embodiments of the invention include techniques for implementing an intelligent data management system for data storage and data management in a cloud computing environment. One embodiment of the invention includes a system which comprises an application server, a distributed data storage system and an intelligent data management system. The application server is configured to host a data processing application. The distributed data storage system is configured to store data generated by a network of devices associated with the data processing application. The intelligent data management system is configured to manage data storage operations for storing the data generated by the network of devices in the distributed data storage system. For example, the intelligent data management system is configured to determine one or more data types of the data generated by the network of devices and select one of a plurality of repositories within the distributed data storage system to store the data based on the determined data types.

Other embodiments of the invention include, without limitation, methods and articles of manufacture comprising processor-readable storage media for implementing an intelligent data management system for data storage and data management in a cloud computing environment.

BRIEF DESCRIPTION OF THE DRAWINGS

FIG. 4 schematically illustrates a process implemented by an intelligent data management system for maintaining registration information of registered users and associated registered devices in a database to support cluster aware resource allocation, according to an exemplary embodiment of the invention.

DETAILED DESCRIPTION

Embodiments of the invention will be described herein with regard to systems and methods for implementing and intelligent data management system for data storage and data management in a cloud computing environment. For illustrative purposes, exemplary embodiments of the invention will be discussed in the context of implementing intelligent data management systems and methods to support IoT services in a cloud computing environment, although it is to be understood that the intelligent data management systems and methods described herein can be implemented with other applications that require management of large amounts of data (e.g., big data analytics, etc.). As explained in further detail below, intelligent data management systems according to exemplary embodiments of the invention implement various methods that are configured to optimize data movement between devices in an IoT environment, and provide pattern aware storage provision and resource allocation for efficient storage and management of a massive amount of structured and unstructured IoT data in a cloud computing environment.

Figure 1:
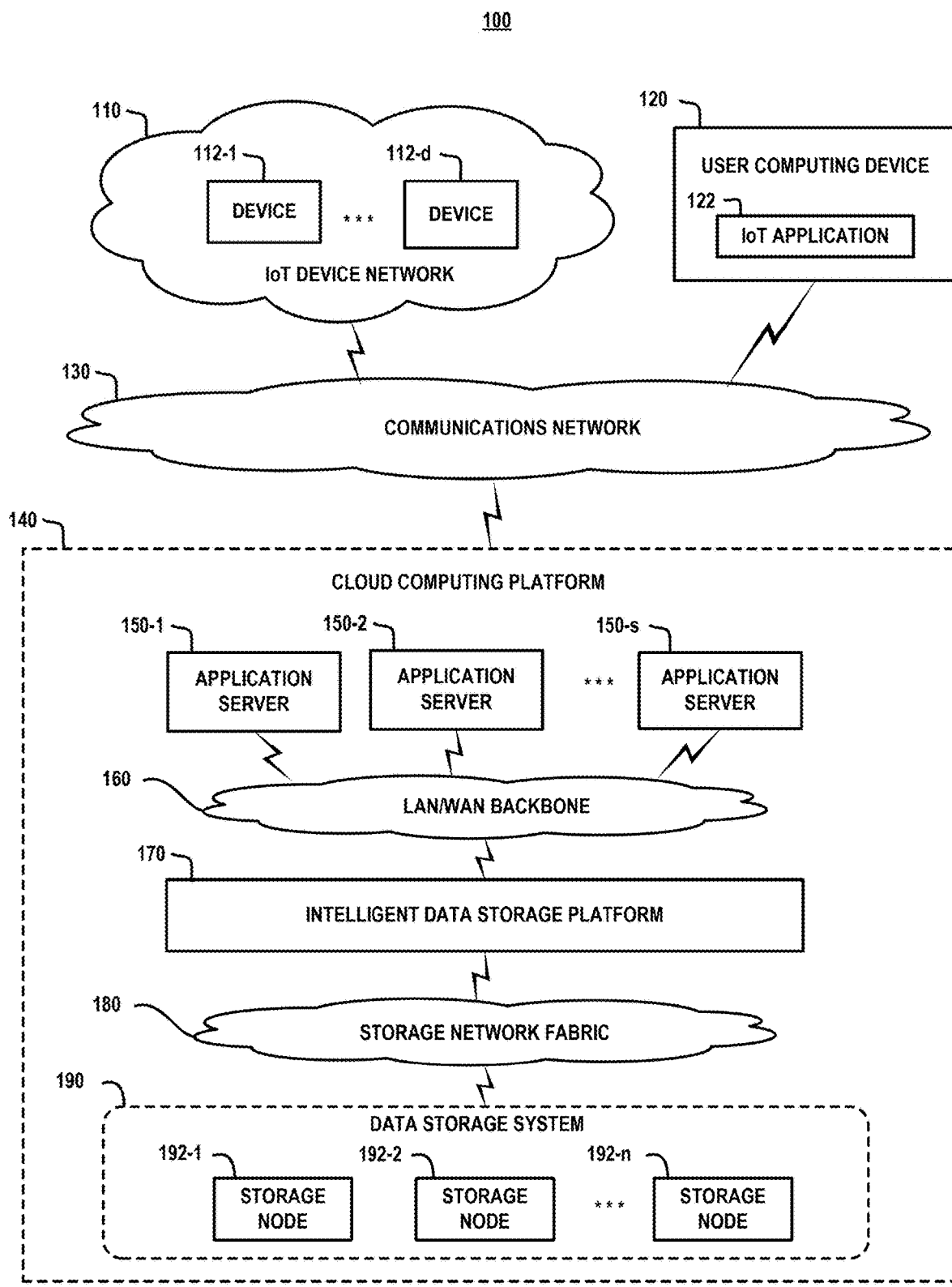
FIG. 1 is a high-level schematic illustration of a system that implements an intelligent data management system for data storage and data management in a cloud computing environment, according to an exemplary embodiment of the invention.

FIG. 1 is a high-level schematic illustration of a system 100 that implements an intelligent data management system for data storage and data management in a cloud computing environment, according to an exemplary embodiment of the invention. The system 100 comprises an IoT device network 110 comprising a plurality of IoT devices 112-1, . . . , 112-d (collectively referred to as IoT devices 112), a client computing device 120 which may execute a client-side IoT application 122, a communications network 130, and a cloud computing platform 140. The cloud computing platform 140 is accessible by the IoT device network 110 and the client computing device 120 over the communications network 130. The cloud computing platform 140 comprises a plurality of application servers 150-1, 150-2, . . . , 150-s (collectively referred to as application servers 150), a computing platform network 160, an intelligent data management system 170, a storage network fabric 180, and a data storage system 190 comprising a plurality of data storage nodes 192-1, 192-2, . . . , 192-n (collectively referred to as data storage nodes 192).

The IoT devices 112 that operate within the IoT device network 110 may comprise various types of devices, objects and things such as mobile computing devices, smart phones, RFID devices, smart sensors, smart appliances, wireless sensors, and other types of smart devices, objects and things that are configured to support IoT applications for one or more application domains. The IoT devices 112 generate data which is uploaded to the cloud computing platform 140 over the communications network 130 for data processing, data storage and data management by the cloud computing platform 140. In addition, the IoT devices 112 access and download data from the cloud computing platform 140 over the communications network 130.

The user computing device 120 may comprise one of various types of computing devices such as a desktop computer, a laptop computer, a server, a smart phone, an electronic tablet, etc., which allows a user or administrator to access the cloud computing platform 140 and/or the IoT device network 110 over the communications network 130. In this regard, in some embodiments, the client-side IoT application 122 may be utilized to configure and manage the network of IoT devices 112. In other embodiments, the client-side IoT application 122 may be utilized to access and process IoT data which is uploaded by the network of IoT devices 112 and stored in the cloud computing platform 140.

While the communications network 130 is generically depicted in FIG. 1, it is to be understood that the communications network 130 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, in some embodiments, the communications network 130 comprises combinations of multiple different types of communications networks each comprising network devices configured to communicate using Internet Protocol (IP) or other related communication protocols. The communications network 130 comprises intermediate points (such as routers, switches, etc.) and other elements (e.g., gateways) that form a network backbone to establish communication paths and enable communication between network endpoints.

In one embodiment, the cloud computing platform 140 performs data processing, data storage, and data management functions to support one or more IoT network applications and/or other types of high performance computing (HPC) applications such as deep learning applications, machine learning, big data analytics, or other types of HPC applications that are typically implemented using a public cloud-based service system to deliver consumer or business applications and services to multiple end users, service providers, and/or organizations. In other embodiments, the cloud computing platform 140 comprises a private cloud platform that is accessible by a single organization, for example. In the exemplary embodiments discussed herein, the application servers 150 are configured to host and manage one or more IoT applications, which are used by multiple, simultaneously connected users and/or entities in one or more application domains. Depending on the implementation of the cloud computing platform 140, the application servers 150 are configured to, e.g., execute business logic, execute scripts and services to query databases, and perform other computing functions that are needed to host and deliver IoT applications and services to multiple end users, service providers, and/or organizations. In one embodiment of the invention, the application servers 150 and the constituent system components of the cloud computing platform 140 are implemented using (i) a cluster of servers that reside in a single facility (e.g., data center facility of private company) or (ii) a cluster of servers that reside in two or more data center facilities or remote locations (distributed over a cloud network) of a given service provider, for example.

The computing platform network 160 is configured to enable communication between the application servers 150 and the intelligent data management system 170, as well as to enable peer-to-peer network communication between various server and computing nodes within the cloud computing platform 140. Depending on the network distribution and geographic location of the constituent components and nodes of the cloud computing platform 140, the computing platform network 160 may comprise, for example, a LAN, a WAN, or a combination of one or more LANs and WANs, as well as other types of communication networks that are commonly used to implement cloud computing systems. The storage network fabric 180 can be implemented using any suitable networking system and protocol to enable shared access to the data storage system 190 by the various server and computing nodes within the cloud computing platform 140. In one embodiment, the computing platform network 160 and the storage network fabric 180 can be integrated into a converged framework such as a converged Ethernet framework using known techniques.

The data storage system 190 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. In one embodiment, the data storage nodes 192 comprise storage appliances with memory controllers, processors, cache memory, and non-volatile storage media to provide persistent storage resources for the application servers 150 and other computing nodes of the cloud computing platform 140. The data storage devices of the data storage nodes 192 may include one or more different types of persistent storage devices, or data storage arrays, such as hard disk drives (HDDs) or solid-state drives (SSDs), or other types and combinations of non-volatile memory. In one embodiment, the data storage nodes 192 are implemented using, for example, an enterprise-class storage platform comprising high-performance, scalable storage arrays, which can be implemented for hyper-scale computing systems. For example, the data storage system 190 can be implemented using commercially available storage array systems of Dell EMC including, but not limited to, NS S, XtremIO, UNITY, VMAX, VNX, ScaleIO, etc.

In some exemplary embodiments, the data storage system 190 comprises a distributed data storage system which is configured to include a plurality of data storage pools, wherein each data storage pool is logically divided into a plurality of logical number units (LUNs), and wherein the number of LUNs in the data storage pools can be the same or different. The data storage pools comprise groups (e.g., storage arrays) of data storage devices such as HDDs, Flash storage devices, SSD devices, or other types and combinations of non-volatile memory and associated drive types. The data storage pools may include homogeneous storage pools, heterogeneous storage pools, or a combination of homogeneous and heterogeneous storage pools. Homogeneous data storage pools have a single drive type (e.g., Flash, HDD, etc.), whereas heterogeneous data storage pools can consist of different drive types. In some embodiments, a data storage pool may comprises hundreds of drives (e.g., HDD and/or SSD) to provide a large storage capacity. The data storage pools are logically divided into LUNs, wherein the number of LUNs in the data storage pool can be the same or different. Moreover, the size of the LUNs can be different in different storage pools. The storage pools provide support for automated storage tiering, where faster SSDs can serve as a data cache among a larger group of HDDs, for example.

The cloud computing platform 140 can host a multitude of IoT applications across various application domains, wherein the IoT device network 110 (and other IoT device networks) associated with these IoT applications can exponentially generate vast amounts of data that needs to be processed, managed, and stored by the cloud computing platform 140. For example, in an IoT cloud computing system that is configured to support one or more application domains, the cloud computing system 140 would need to manage and process IoT data received from various IoT devices across various application domains including, but not limited to, healthcare, home and building, retail, energy, manufacturing, transportation, logistics, and/or media domains.

The IoT device network 110 may comprises a network of sensor devices 112 which are configured to collect raw sensor data and transmit the collected sensor data to the cloud computing platform 140. The IoT device network 100 may comprises sensor devices that are utilized for, e.g., environmental monitoring (e.g., temperature, pressure, humidity, sound, etc.), process management monitoring, healthcare monitoring, industrial monitoring, traffic monitoring, etc. By way of example, for agriculture applications, sensor devices can be utilized for monitoring harvesting operations, crop growth, and detection of crop disease. In this regard, IoT sensor devices 112 can collect agricultural information in the form of text data or images of the crop and field. For weather applications, a sensor network can be utilized to monitor weather conditions in a given area.

Furthermore, for the healthcare domain, the IoT 112 devices can be utilized for remote health monitoring and emergency notification. Health monitoring devices include blood pressure and heart rate sensors, blood oxygen content sensors, pacemakers, hearing aids, etc. Insurance companies can utilize IoT data to automatically track and reconcile insurance claims and ensure proper payments are made to claimants. Furthermore, for the home and building domain, the IoT devices 112 can be implemented to monitor and control mechanical, electrical and electronic systems that are utilized in residential, commercial or industrial buildings. For example, home and building automation systems can implement IoT devices/sensors to automatically control lighting, heating, ventilation, air conditioning, appliances, communication systems, entertainment and home security devices, etc.

Moreover, for the energy domain, the IoT devices 112 can include sensors and actuators that are implemented, for example, in energy consuming devices (e.g., switches, power outlets, light bulbs, etc.) and be equipped to communicate with power supply companies to provide IoT data that enables the power supply companies to effectively balance power generation and energy usage through "smart grids." For example, IoT devices would enable power supply companies to acquire and process IoT data with regard to energy usage in various regions and automatically control and manage production and distribution of electricity in such regions, e.g., control and manage distribution devices such as transformers. In addition, for the manufacturing domain, IoT devices can be used for network control and management of manufacturing equipment or manufacturing process control.

In an embodiment where the cloud computing system 140 supports one or more IoT application domains, the cloud computing system 140 can acquire and process large amounts of data received from billions of IoT devices at various geolocations, and be configured to enable cross-domain interaction and platform unification through increased system compatibility, interoperability and functional exchangeability. In this regard, the amount of IoT data that the cloud computing system 140 acquires for processing can exponentially grow over time.

Indeed, IoT applications and other cloud-based applications typically exhibit the following distinct patterns. For example, such applications are data intensive, wherein massive amounts of data are continuously generated from large numbers of sensors and devices. In one exemplary embodiment, a smart field can be implemented using an array of sensors (e.g., humidity sensors, temperature sensors, etc.), wherein a sensor is located every 1-10 meters in a given array (e.g., a 10 square kilometer array), Assuming 1 KB of data (e.g., humidity data, temperature data, etc.) is generated by each sensor per minute, the sensor array would generate more than one terabyte (TB) of data per day, which results in a massive amount of data being ingested by the cloud computing system 140. Another IoT example is a video surveillance system which could generate even more data.

Furthermore, the data which is generated for IoT applications and other cloud-based applications is globally accessed by many users/applications over various geolocations. Indeed, once the massive amount of IoT data is ingested into the cloud computing system 140, the data is typically accessed globally by different requesting entities (e.g., users or applications) from different locations (e.g., across different sites, cities or countries) for different purposes.

Moreover, IoT applications have distinct data access operations. In particular, IoT data is generated by edge sensors and/or edge devices, and such machine-generated data is ingested to the cloud computing system 140. Once the machine-generated data is ingested, the data can be distributed or replicated to one or more data centers or sites, and globally accessed in read mode by many users and/or applications for purposes of analyzing the data in read mode (e.g., analyzing IoT data is a valuable aspect of IoT computing). This use pattern also aligns with many cloud-based applications including, for example, big data analytics, web applications, news media, photo sharing, etc., wherein data replication and global sharing are important backbone building blocks for such applications.

The ability to meet performance requirements for data storage and movement (e.g., bandwidth, latency or delay) of IoT data in a cloud computing system is a challenge for quality of service satisfaction. IoT data can be generated quite rapidly, the volume of data can be huge and the types of data can be various. Accordingly, there are technical challenges, such as horizontal scaling of data storage and high-throughput data processing associated with IoT cloud computing systems. Moreover, the IoT data can be collected from many different sources and comprises various types of structured and unstructured data, wherein the data storage resources are expected to have the ability to deal with heterogeneous data resources.

In this regard, embodiments of the invention provide techniques to implement intelligent data management systems that are configured to optimize data movement between devices in an IoT environment, and provide pattern aware storage provision and resource allocations for efficient storage and management of a massive amount of structured and unstructured IoT data in a cloud computing environment. As shown in FIG. 1, in some embodiments, the intelligent data management system 170 comprises a software platform that resides between the application servers 150 and the data storage system 190 to enable the cloud computing system 140 and the storage back-end of the cloud computing system 140 to be "IoT-aware" to optimize IoT data handling, processing, and storage of IoT data to enhance cloud computing performance for IoT eco-systems. In other embodiments, IoT applications that are hosted by the application severs 150 of the cloud computing system 140 can integrate some or all of the functionalities of an intelligent data management system as described herein.

Figure 2:
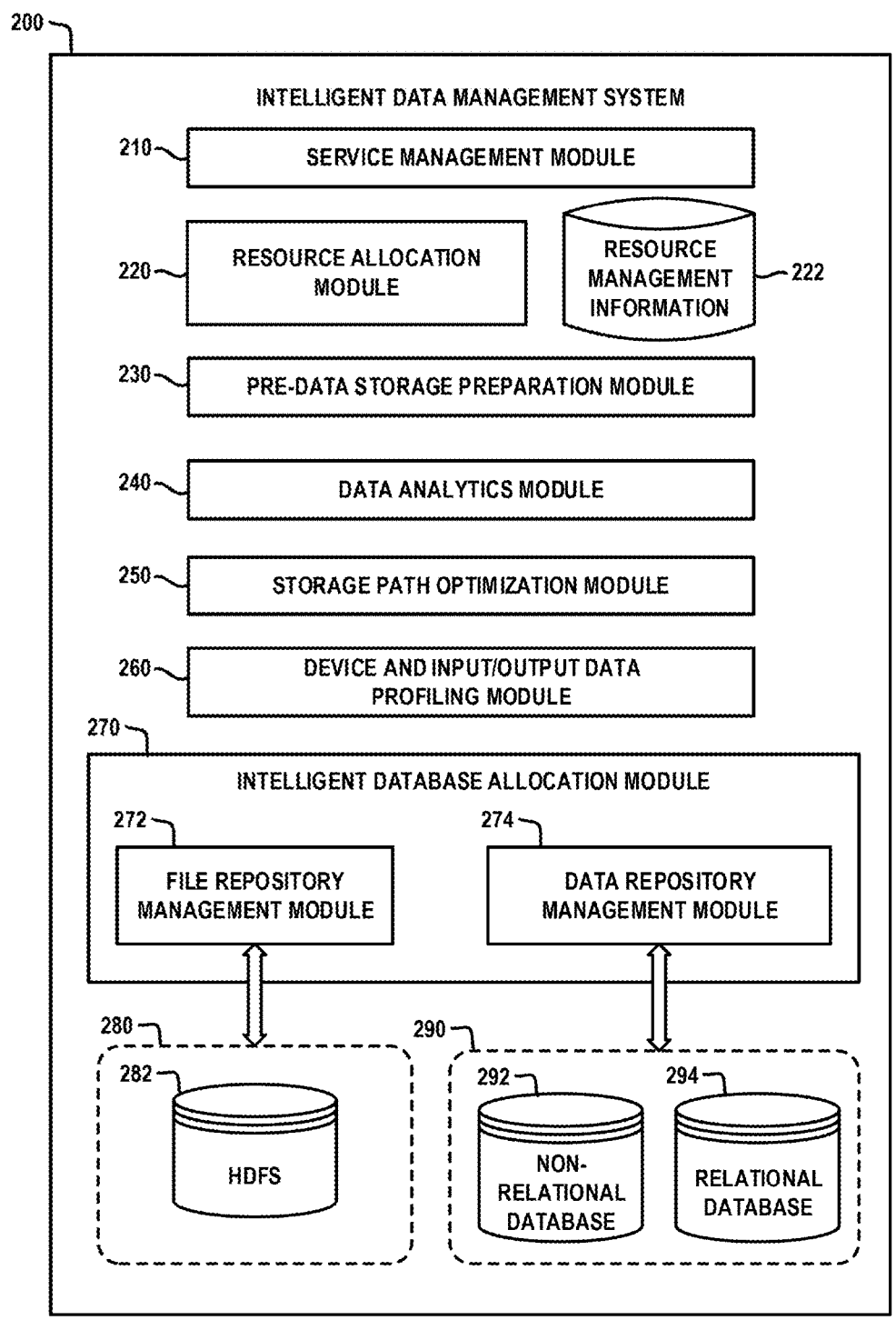
FIG. 2 schematically illustrates an intelligent data management system according to an exemplary embodiment of the invention.

FIG. 2 schematically illustrates an intelligent data management system 200 according to an exemplary embodiment of the invention. In particular, FIG. 2 schematically illustrates an exemplary embodiment of the intelligent data management system 170 which can be implemented in the cloud computing system 140 of FIG. 1. The intelligent data management system 200 comprises a service management module 210, a resource allocation module 220, a resource management information database 222, a pre-data storage preparation module 230, a data analytics module 240, a storage path optimization module 250, a profiling module 260, and an intelligent database allocation module 270. The intelligent database allocation module 270 comprises a file repository management module 272 and a data repository management module 274. The file repository management module 272 is configured to manage one or more file repositories 280, and the data repository management module 274 is configured to manage one or more data repositories 290 (e.g., databases).

In some embodiments, the file repositories 280 are utilized to store and manage unstructured data, such as documents, images, digital audio files, video files, etc. In some embodiments, the file repositories 280 implement a distributed file system 282 such as the Hadoop distributed file system (HDFS). As is known in the art, HDFS is a storage framework for the Apache Hadoop software platform which allows for distributed storage and processing of big data using the MapReduce programming model. The Hadoop framework divides files into large blocks and distributes them across a plurality of nodes in a cluster, and transfers packaged code into the nodes to implement a data parallel processing framework. The file repository management module 272 comprises version control methods that are configured to store and manage multiple versions of files that are stored within the file repositories 280. A version control system implements methods to lock files so that the files can be modified by one user or application at a given time, and to track changes to the files. When a new file is generated or a current file is updated, the changes are "committed" to the file repository so that the latest version is available to authorized users or entities.

In some embodiments, the data repositories 290 implement a non-relational database 292 and a relational database 294. The non-relational database 292 is utilized to store and manage semi-structured data and possibly structured data. For example, the non-relational database 292 may be a distributed non-relational database such as MongoDB, which is a document-oriented database system that utilizes JSON-like documents with a given database schema for storing and managing semi-structured data. A semi-structured data model is a database model where there is no separation between the data and the schema, and the amount of structure that is specified depends on the purpose. Semi-structured data is a form of structured data that does not conform with the formal structure of data models associated with relational databases or other forms of data tables, but contains metadata to separate semantic elements and enforce hierarchies of records and fields within the data. The non-relational database 292 can be implemented using one or more of various data models, such as a column data model, a document data model, a key-value data model, a graph data model, etc.

The relational database 294 is utilized to store and manage structured data based on a relational model of data. In some embodiments, the relational database 294 is implemented using a structured query language (SQL) relational database management system (e.g., MySQL). The relational database 294 is utilized to store and manage structured information such as manufacturing and logistical information, personnel data, and other types of structured data. A SQL relational database is useful for storing and managing structured data that follows a strict schema, and managing relational data with the need for complex joins.

The service management module 210 is configured to perform functions such as, e.g., generating services (e.g., Representational State Transfer (REST)-ful services), exposing a services API (application programming interface), providing uniform resource identifiers (URIs) for RESTful services, etc. As is known in the art, in a REST-ful framework, data and functionality are considered resources and are accessed using URIs.

The resource allocation module 220 is configured to support static and dynamic data management using pre-defined resource meta-models, and to configure and allocate computing and storage resources and related services based on tenant requirements. Further, in some embodiments, the resource allocation module 220 comprises a registration module which is configured to implement a user interface or Web portal which enables users (e.g., individuals and/or entities such as businesses, organizations etc.) to register with the cloud computing platform 140 (FIG. 1) and to register various IoT devices associated with the given user for a given IoT application. As explained in further detail below, a registration process results in the assignment of unique user IDs to registered users, and the assignment of device IDs to registered devices. In some embodiments, the user and device registration information is maintained in the resource management information database 222.

Moreover, in some embodiments, the resource allocation module 220 is configured to perform "cluster aware" resource allocation functions such as storage pool allocation and VM (virtual machine)/server allocation with regard to registered users and their associated registered IoT devices. For example, the resource allocation module 220 can be configured to cluster or otherwise compile user and device registration information, together with storage pool and VM/server allocations, into data structures that are maintained in the resource management information database 222. As explained in further detail below, the "cluster aware" resource allocation techniques are configured to make storage array controllers in the data storage system 190 to be IoT network aware through a user/device registration process in which registered IoT devices of the same user/entity are assigned to the same storage pool, and wherein IoT devices of the same application type are assigned to the same virtual machine or server. The registration process enables an optimal allocation of IoT cloud resources in a way which allows IoT devices of the same user/entity to communicate with minimal delay and which optimizes utilization of virtual machines, thereby optimizing overall performance of the cloud computing platform 140. Exemplary embodiments of the registration and clustering procedures will be discussed in further detail below with reference to FIGS. 3 and 4, for example.

The pre-data storage preparation module 230 implements methods which are configured to divide raw data streams of IoT data, which are uploaded to the cloud computing platform 140 by IoT devices within a given IoT device network, into different data types, e.g., structured data, semi-structured data, unstructured data, etc. In addition, pre-processing of raw data is performed to facilitate batch processing of the raw data, wherein the types of data pre-processing functions will vary depending on the application and the type of data. For example, traffic data that collected by a network of IoT devices can be pre-processed using data cleaning and summarization, followed by storage of the pre-processed traffic data for subsequent batch processing.

As another example, image data that is received from IoT camera devices can be pre-processed using various methods that are commonly utilized to improve the image data by suppressing unwanted distortions or enhancing image features that are deemed important for further processing. Other image pre-processing techniques include geometric transformations of images (e.g. rotation, scaling, translation). By way of specific example, For example, various types of data processing functions that are commonly performed on raw images of a training dataset for deep learning model training include decoding (e.g., converting JPEG files to raw RGB (red, green, blue) samples), data re-sizing, normalization, whitening, data augmentation operations (e.g., data rotations, shifts, flips), etc. For instance, image augmentation methods are applied to images within a training dataset to create multiple altered versions of the same image, thereby providing more images to use for the training process to enhance the accuracy of the deep learning model and thus, allow for enhanced classification/inference processing.

The data analytics module 240 may implement various methods for processing IoT data depending on the application. For example, the data analytics module 240 can implement artificial intelligence or neural network processing techniques to analyze the pre-processed image data to perform, e.g., face detection or other image classification or analysis methods either in real-time or batch processing. As another example, big data analytic methods can be utilized to process a massive amount of traffic data to perform functions such as traffic prediction, etc.

The storage path optimization module 250 implements methods that are configured to decrease the time for uploading large IoT data files or data blocks to the cloud computing platform 140 and transferring large IoT data files or data blocks between IoT devices 112 within the IoT device network 110 or between IoT devices 112 and the user computing device 120. The storage path optimization module 250 is configured to utilize information in the resource management information database 222 to perform functions such as controlling the upload of data from the IoT 112 devices to the cloud computing platform 140, as well as control the transfer of IoT device data from a source device to a destination device. As explained in further detail below, storage path optimization techniques are implemented to minimize the dependency on the communications network 130 (e.g., Internet) for data upload (uplink) from the devices 112 within the IoT device network 110 to the cloud computing platform 140 and transferring IoT data between the network connected devices 112 and the user computing device 120 to thereby minimize data traffic and latency of data uploads over the communications network 130. In one embodiment of the invention, the storage path optimization module 250 is configured to implement various methods as disclosed in U.S. Pat. No. 9,882,985, entitled "Data Storage Path Optimization For Internet of Things Computing System," which is commonly assigned and incorporated herein by reference. Various methods for storage path optimization will be discussed in further detail below in conjunction with FIGS. 5, 6, 7, and 8, for example.

The profiling module 260 implements methods that are configured to determine data input/output (I/O) access patterns of network devices (e.g., data write and data read patterns). The data I/O patterns are then utilized by various modules (e.g., the resource allocation module 220, the storage path optimization module 250, the database allocation module 270, etc.) to make data storage allocation decisions that increase or otherwise optimize data storage utilization and data throughput of the cloud computing platform 140. In addition, the profiling module 260 implements methods that are configured to determine device profiles of IoT devices (e.g., low profile, high profile, etc.)

based on factors such as the type of data generated by the devices and the applications which process the data generated by the device. The device profiling allows the intelligent database allocation module 270 to determine whether to store data in a target memory tier of a hierarchical memory tier framework, or a target storage tier of a hierarchical storage tier framework. For example, a given type of data (e.g., water system sensor data) may be stored within an in-memory database for real time analysis.

The intelligent database allocation module 270 implements methods that are configured to dynamically select a given type of repository, storage tier, memory tier, etc., to store the data which is ingested by the cloud computing platform 140. The database allocation is based on various factors including, but not limited to, the type of data, the type of IoT devices generating or accessing the data, the type of applications that process the data, etc. For example, the intelligent database allocation module 270 can determine whether a given type of data is to be stored in one of the file repositories 280 or data repositories 290. In particular, image data (e.g., surveillance videos) may be stored in the file repository 280 (e.g., Hadoop) to enable batch analysis. In addition, semi-structured data may be stored in the non-relational database 292, while structured data may be stored in the relational database 294. Moreover, the intelligent database allocation module 270 can dynamically determine whether data should be stored in column-based database format or a row-based database format. In addition, depending on the type of data and the application processing the data, the intelligent database allocation module 270 can determine whether to store data in a target memory tier of a hierarchical memory tier framework, or a target storage tier of a hierarchical storage tier framework. For example, a given type of data (e.g., water system sensors) may be stored within an in-memory database for real time analysis.

As noted above, the resource allocation module 220 performs functions such as cluster-aware resource allocation. In an IoT computing environment, IoT data tends to move between a set of devices (e.g., device cluster) which belongs to a same profile, e.g., a same user, a group of sensors in a same region that report data to an aggregator point, etc. In this regard, a cluster aware resource allocation process is implemented to locate data for a given "cluster" in a same datastore to achieve maximum performance as data mobility within the cluster is high. Copying data within the same datastore or the same array is much faster than copying data between remote sites or different arrays.

Figure 3:
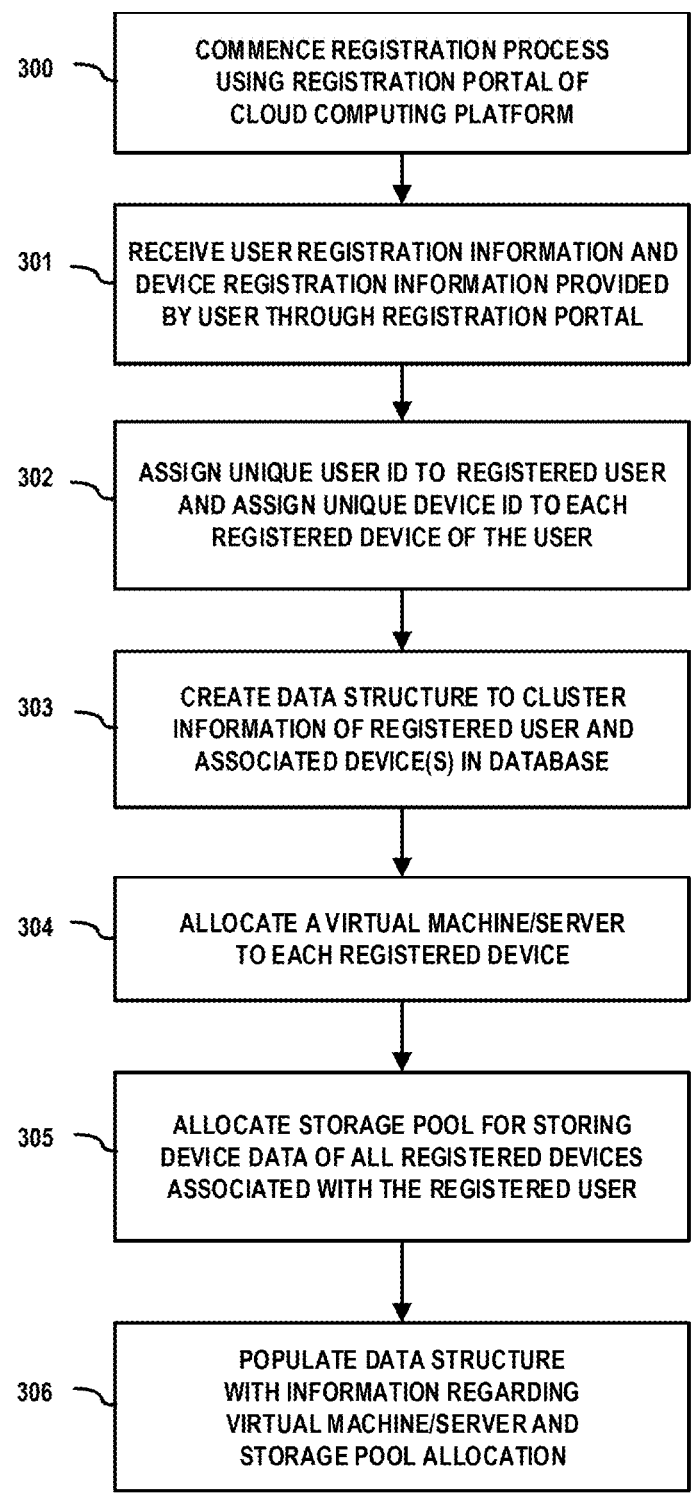
FIG. 3 illustrates a flow diagram of a method that is implemented by an intelligent data management system for performing cluster aware resource allocation, according to an exemplary embodiment of the invention.

For example, FIG. 3 is a flow diagram of a method that is implemented by an intelligent data management system for performing cluster aware resource allocation, according to an exemplary embodiment of the invention. In particular, FIG. 3 is a flow diagram of a method for clustering registered user/device information and allocating virtual machines and storage pools to registered users/devices, according to an embodiment of the invention. As noted above, in one embodiment of the invention, FIG. 3 illustrates modes of operation of the resource allocation module 220 of the intelligent data management system 200 of FIG. 2. For illustrative purposes, the process flow of FIG. 3 will be discussed with reference to the embodiments of FIGS. 1 and 2. Referring to FIG. 3, a given user (e.g., an individual or entity) wanting to register with the cloud computing platform 140 will commence a registration process using a registration portal (e.g., registration module) of the cloud computing platform 140 (block 300). The resource allocation module 220 of the intelligent data management system 200 will receive the user registration information and device registration information provided by the user through the registration portal (block 301).

In one embodiment of the invention, the user information comprises, for example, the name of the user, the credentials of the user (e.g., password), contact information, and other user information that is typically obtained when a user establishes an account and registers with an IoT service. Furthermore, in one embodiment of the invention, the device registration information for a given device includes information such as, e.g., device type (e.g., mobile phone, laptop, appliance, etc.) and a unique device ID. For example, the unique device ID can be a MAC (media access control) address associated with the given device. As is known in the art, the MAC address is a unique hardware number of a network interface (e.g., network interface card) which is utilized by a given device for network connectivity. The device registration information may include other types of device information that is typically provided when a user registers a device with an IoT service. The registration process for an IoT service will vary depending on the registration protocol implemented by the cloud computing platform 140.

The registration process further comprises assigning a unique user ID to the registered user and assigning a unique device ID to each registered device of the registered user (block 302). In one embodiment of the invention, the unique device ID that is assigned to a given device is based on the MAC address associated with the given device. A data structure for the registered user is then generated to cluster the registration information associated with the user and the associated registered devices of the user, which data structure is maintained in, e.g., the resource management information database 222 (block 303). An example embodiment of a data structure for maintaining registration information of a registered user and associated registered devices in the database will be discussed below with reference to FIG. 4.

The registration process further comprises allocating a VM or a server to each registered device (block 304). In one embodiment of the invention, all registered devices having the same or similar application type are assigned to the same VM or server. In addition, the registration process comprises allocating, to the registered user, a storage pool in the distributed data storage system 190 to store data of all registered devices associated with the registered user (block 305). The data structure for the registered user is then populated with the VM/server and storage pool allocation information (block 306).

FIG. 4 schematically illustrates a process implemented by an intelligent data management system for maintaining registration information of registered users and associated registered devices in a database to support cluster aware resource allocation, according to an exemplary embodiment of the invention. In particular, FIG. 4 illustrates a data structure 400 for maintaining registration information of registered users and associated registered devices in a database, according to an embodiment of the invention. The data structure 400 shown in FIG. 4 is used to persistently store clustered user/device registration information and associated VM/server and storage pool allocation information, which is generated as a result of a registration process. The data structure 400 comprises User ID data fields 402, Device Type data fields 404, MAC Address data fields 406, Device ID data fields 408, VM data fields 410, Storage Pool data fields 412, and LUN data fields 414. The data structure 400 comprises a first information cluster 400-1 associated with a first registered user, and a second information cluster 400-2 associated with a second registered user.

The User ID data fields 402 store the unique user IDs of registered users. For example, as shown in FIG. 4, the first information cluster 400-1 is associated with the first registered user having a unique user ID of U1, and the second information cluster 400-2 is associated with the second registered user having a unique user ID of U2. The Device Type data fields 404 store the device type information with regard to the registered IoT devices of the registered users. For example, as shown in FIG. 4, the first registered user U1 has a plurality of registered IoT devices to implement a home automation IoT application (e.g., Cooker, E-Curtains, Door, etc.), for example, using a Mobile device. Moreover, the second registered user U2 has a plurality of registered IoT devices including a Mobile device, a Laptop device, a Cooker device (e.g., a smart cooking appliance) and a Car. The MAC Address data fields 406 store the MAC addresses of the registered IoT devices of the registered users. The Device ID data fields 408 store the unique device IDs that are assigned to the registered devices based on, e.g., the MAC addresses of the registered devices.

In addition, the data structure 400 stores the VM and storage pool allocation information for the registered users and associated devices. In particular, the VM data fields 410 identify the VMs (or servers) that are allocated to process data associated with the registered devices. For example, as shown in FIG. 4, for the first registered user U1, a first virtual machine VM1 is assigned to the registered mobile device, a second virtual machine VM2 is assigned to the registered Cooker device, and a third virtual machine VM3 is assigned to the E-Curtains and Door devices. In addition, for the second registered user U2, the first virtual machine VM1 is assigned to the Mobile device and the Laptop device, the second virtual machine VM2 is assigned to the Cooker device, and a fourth virtual machine VM4 is assigned to the Car.

As noted above, in one embodiment of the invention, all registered IoT devices of the same or similar device type, or which are associated with the same or similar type of application, are assigned to the same VM. By way of example, as shown in FIG. 4, the Mobile and Laptop devices of the registered users U1 and U2 (which can be used to control other registered devices) are assigned to the same virtual machine VM1. The Cooker devices of the first and second registered users U1 and U2 are assigned to the same virtual machine VM2. The E-Curtains and Door devices (which are automated home/building devices) of the first registered user U1 are assigned to the third virtual machine VM4. The registered Car device of the second registered user U2 is assigned to a different virtual machine VM4.

As further shown in FIG. 4, the Storage Pool data fields 412 identify the storage pools within the backend data storage system of the IoT computing platform, which are allocated to the registered users to store the data associated with the registered devices of the users. For example, storage pool P1 is assigned to the first registered user U1 and storage pool P2 is assigned to the second registered user U2. The LUN data fields 414 identify the LUN in the given storage pool in which data is stored for a given registered device. For example, the storage pool P1 allocated to the first registered user U1 is logically divided into a plurality of LUNS including LUN 100, LUN 101, LUN 102, and LUN 103. The data associated with the registered Mobile device of registered user U1 is stored in LUN 100 of storage pool P1, etc.

The clustering of information in the data structure 400 of FIG. 4 enables the intelligent data management system 200 of the cloud computing platform 140 to be IoT aware, which optimizes data handling and enhances the performance of the cloud computing platform 140. An IoT aware cloud computing platform provides a mechanism to associate the networking and storage protocols in a way that minimizes the upload delay in the IoT network from a source device (sender of data) to the IoT cloud provider network and from IoT cloud provider to a destination device (receiver of data), and eliminating redundant upload/download for the same data content.

Figure 5:
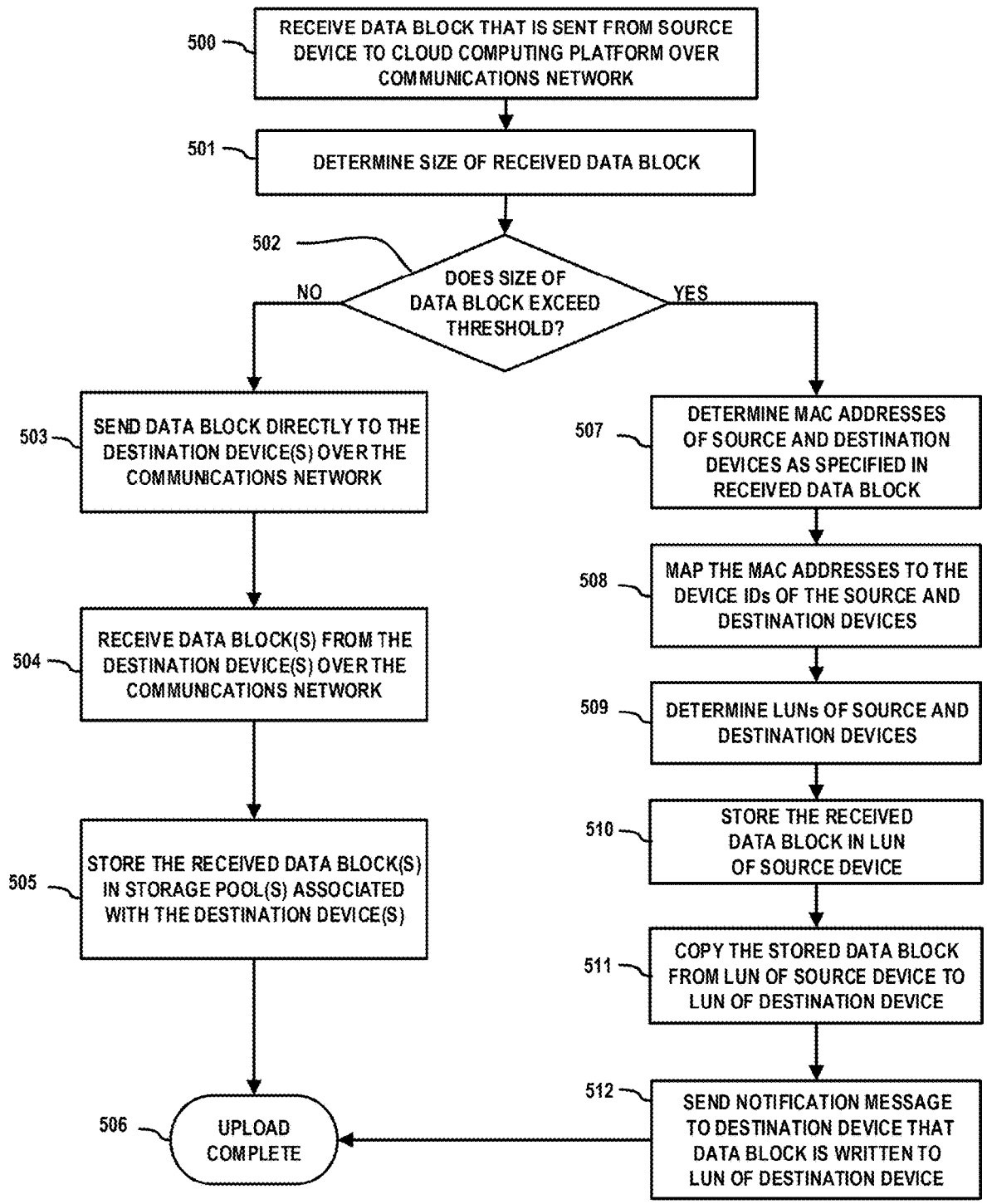
FIG. 5 illustrates a flow diagram of a method that is implemented by an intelligent data management system for performing data storage path optimization in a cloud computing environment, according to an embodiment of the invention.

For example, FIG. 5 illustrates a flow diagram of a method that is implemented by an intelligent data management system for performing data storage path optimization in a cloud computing environment, according to an embodiment of the invention. In one embodiment of the invention, FIG. 5 illustrates operational modes of the storage path optimization module 250 of the intelligent data management system 200. For illustrative purposes, the process flow of FIG. 5 will be discussed in the context of the embodiments of FIGS. 1 and 2. Referring to FIG. 5, an application server 150 of the cloud computing platform 140 receives a data block (e.g., data file) that is sent over the communications network 130 from a source device within the IoT device network 110 (block 500). The received data block is specified to be sent to one or more destination devices. The storage path optimization module 250 will determine a size of the received data block (block 501) and compare the determined data block size to a predefined threshold (block 502). The predefined threshold can be specified by an administrator or service provider of the cloud computing platform 140. For example, in one embodiment of the invention, the predefined threshold is 10 Kbytes.

Next, the storage path processing for uploading the received data block to the destination device(s) will depend on whether the size of the received data block either exceeds or does not exceed the predefined threshold. For example, in one embodiment of the invention, if the size of the data block does not exceed the predefined threshold (negative determination in block 502), the application server will send the data block to the destination device(s) over the communications network 130 (block 503). The destination device(s) will then send the data block to the cloud computing platform 140 via the communications network 130. When an application server receives the data block from a given destination device (block 504), the application server will access the back-end data storage system 190 and store the received data block in a storage pool assigned to the registered user of the destination device (block 505). At this point, the data upload process is deemed complete (block 506).

On the other hand, if the size of the received data block does exceed the predefined threshold (affirmative determination in block 502), the storage path optimization module 250 will access the data storage system 190 and initiate a process which comprises (i) storing the data block in a datastore associated with the source device, (ii) storing a copy of the data block in a datastore associated with a destination device, and (iii) sending a notification message to the destination device over the communications network to notify the destination device that the data block is stored in the datastore.

More specifically, in one embodiment of the invention shown in FIG. 5, if the size of the received data block does exceed the predefined threshold (affirmative determination in block 502), the storage path optimization module 250 will proceed to determine the MAC addresses of the source and destination devices, which are specified in the received data block (block 507). The storage path optimization module 250 will then determine the device IDs of the source and destination devices by mapping the MAC addresses to the device IDs of the registered devices as specified in the user/device cluster data structures stored in the resource management information database 222 (block 508). For example, as discussed above with reference to the example data structure 400 of FIG. 4, the MAC addresses 406 of registered IoT devices 404 are mapped to unique device IDs 408 that are assigned to the registered IoT devices 404. This steps allows the storage path optimization module 250 to confirm that the MAC addresses specified in the received data block are mapped to registered devices.

Next, the storage path optimization module 250 will utilize the device IDs to determine the LUNs of the storage pools which are allocated to the source and destination devices (block 509). For example, in one embodiment of the invention, the associated LUNs are determined by mapping the device IDs of the source and destination address to the assigned LUNs as specified in the user/device cluster data structures stored in the resource management information database 222. The received data block is then stored in the LUN assigned to the source device (block 510). A copy of the stored data block is written to the LUN(s) assigned to the destination device(s) (block 511). With this process, the copy of the stored data block is transmitted over the back-end storage network (e.g., SAN) from one LUN to another LUN (which may or may not be in the same storage pool), as opposed to the communications network 130. A notification message is then sent the destination device(s) over the communications network 130 to alert the destination device(s) that the data block from the source device is written to the LUN of the destination device(s) and available for access (block 512). After the notification message is sent, the data upload is deemed to be complete (block 506).

For large size data blocks, the above process (blocks 507-512) utilizes unique device IDs of the source device and destination device(s), and the storage allocation matrix information to move the data block between the source and destination LUNs without having to transmit the data block directly to the destination devices(s) over the communications network 130 (e.g., Internet). This serves to minimize the dependency the communications network 130 for data upload in IoT applications for large data files.

Figure 6:
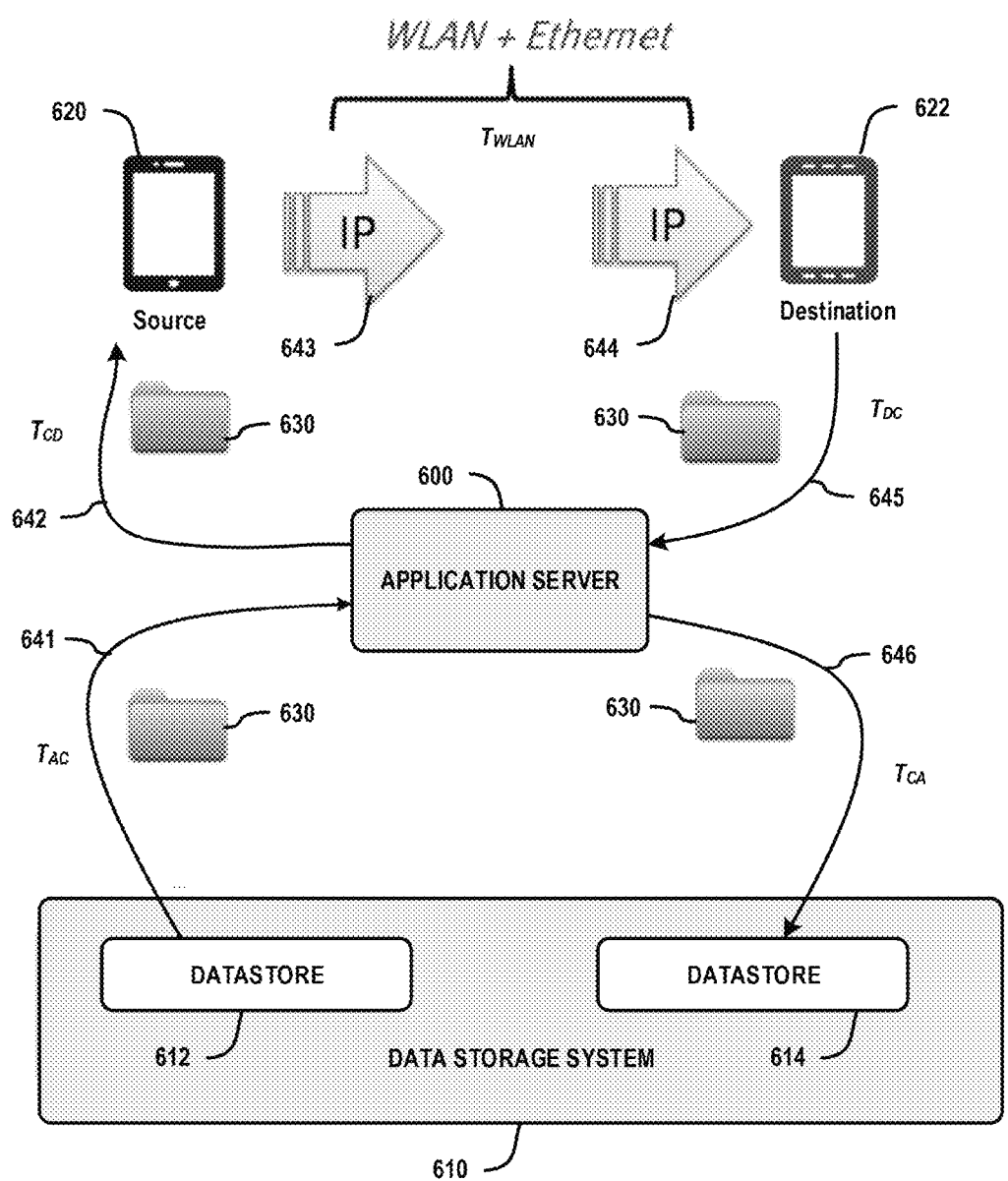
FIG. 6 schematically illustrates a method that is implemented by an intelligent data management system for sending a data file from a source device to a destination device when a size of the data file does not exceed a predefined threshold, according to an embodiment of the invention.
Figure 7:
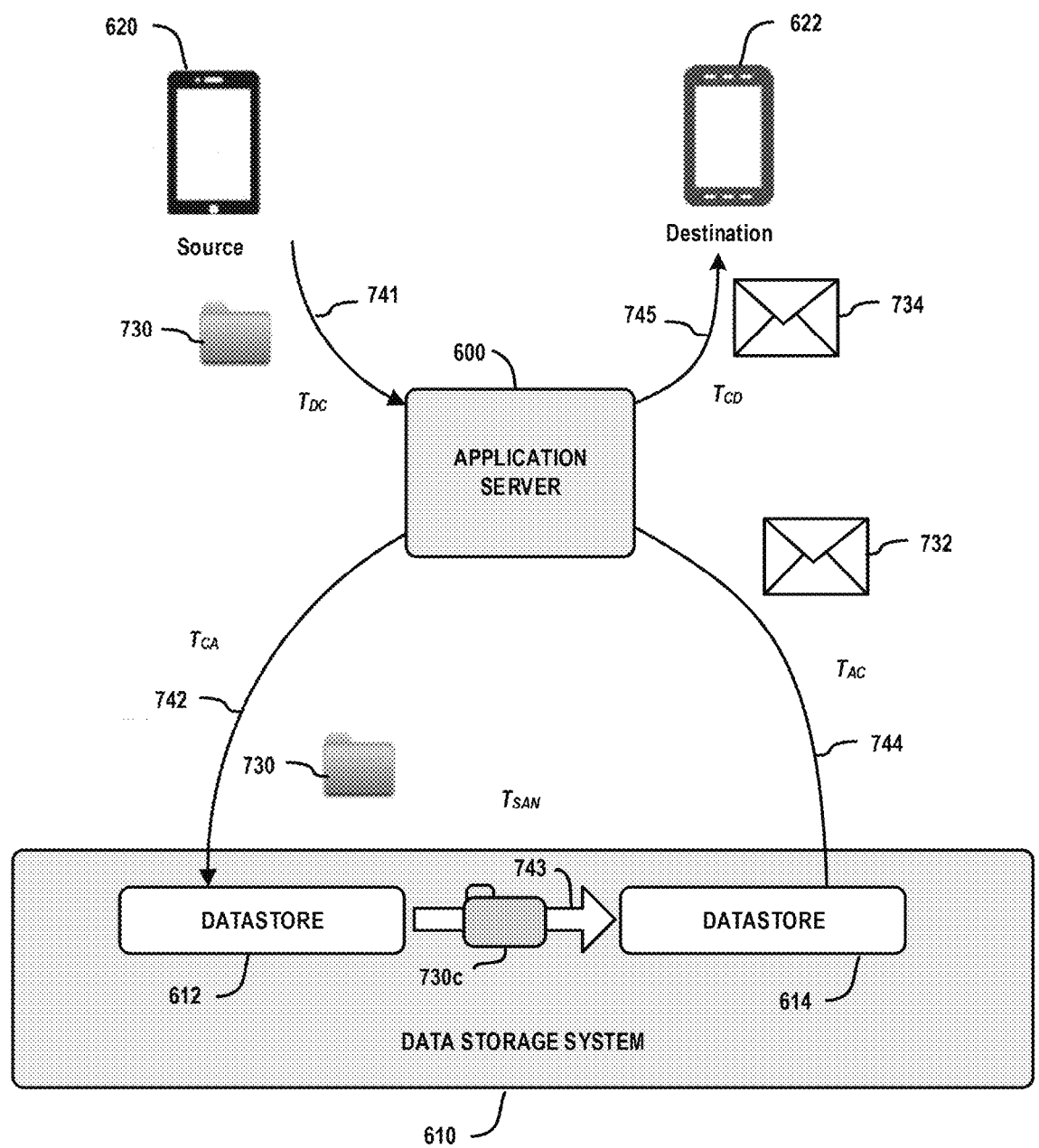
FIG. 7 schematically illustrates a method that is implemented by an intelligent data management system for uploading a data file from a source device to a destination device when a size of the data file exceeds a predefined threshold, according to an embodiment of the invention.
Figure 8:
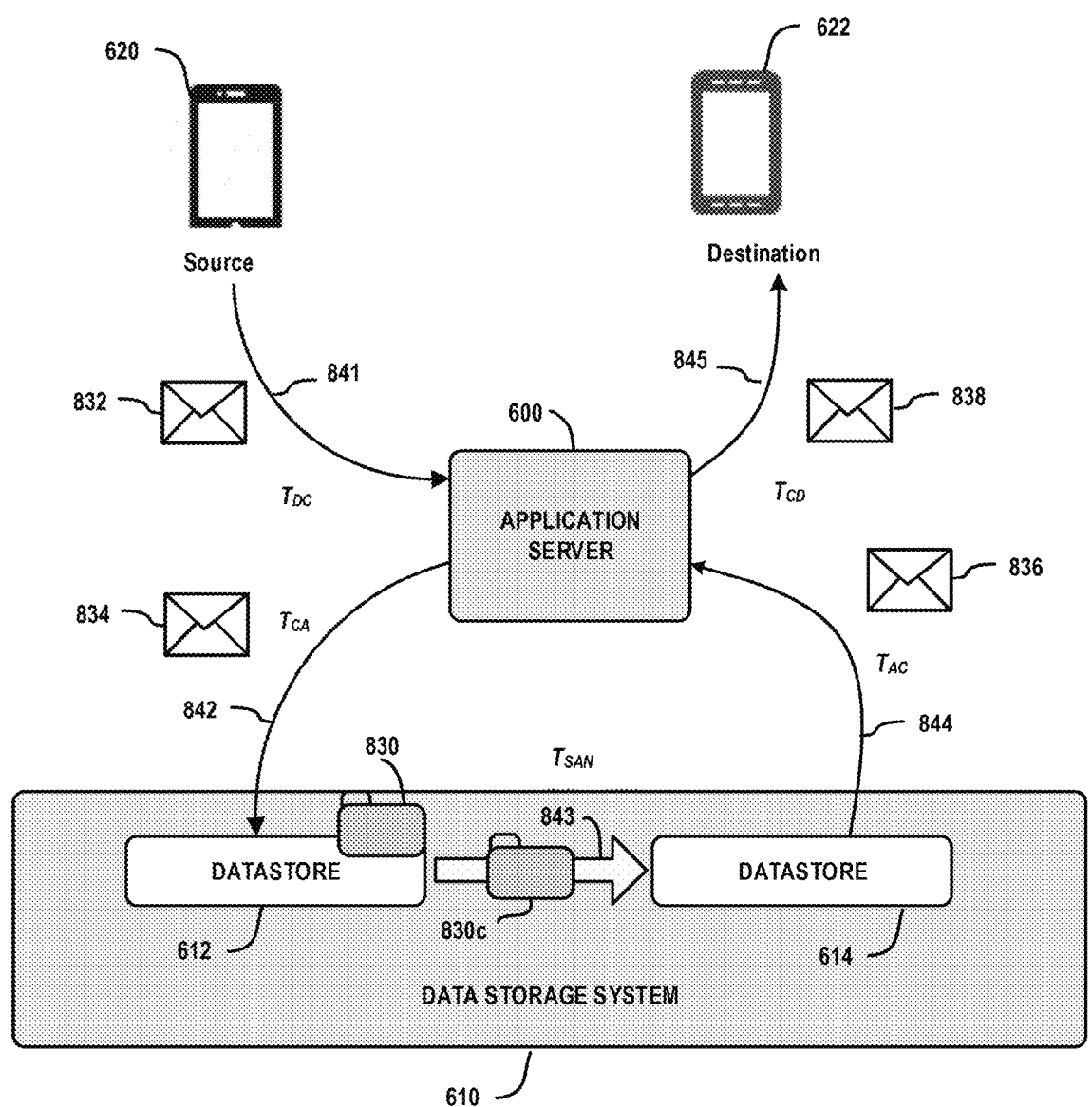
FIG. 8 schematically illustrates a method that is implemented by an intelligent data management system for uploading a data file from a source device to one or more destination devices when a size of the data file exceeds a predefined threshold, according to another embodiment of the invention.

FIGS. 6, 7, and 8 schematically illustrate various modes of operation of the storage path optimization module 250 for uploading IoT data from a source device to one or more destination devices based on the method of FIG. 5. In particular, FIG. 6 depicts an application server 600 and a distributed data storage system 610 comprising a first datastore 612 and a second datastore 614 (e.g., storage pools). FIG. 6 schematically illustrates a method that is implemented under the control of an intelligent data management system for sending a data file 630 (or more generally, data block) from a source device 620 to a destination device 622 when a size of the data file 630 does not exceed a predefined threshold. In the example of FIG. 6, it is assumed that the data file 630 is stored in the first datastore 612 which is associated with the source device 620, and that the source device 620 sends a request to the IoT application server 600 to send the data file 630 to the destination device 622.

As an initial step, the application server 600 accesses the data file 630 from the first datastore 612 of the back-end data storage system 610, wherein the data file 630 is transmitted from the first datastore 612 to the application server 600 over a data storage network link 641. The application server 600 then transmits the data file 630 to the source device 620 via a network link 642 over an IP communications network. The source device 620 then sends the data file 630 to the destination device 622 over one or more IP communication network links 643, 644 (e.g., WLAN and Ethernet). After receiving and processing the data file 630, the destination device 622 transmits the data file 630 to the application server 600 via a network link 645 over the IP communications network. The application server 600 then sends the data file 630 to the backend data storage system 610 via a data storage network link 646 to store the data file 630 in the datastore 614 associated with the destination device 622.

In the example of FIG. 6, the time to send ($T_{SEND}$) the data file 630 from the datastore 612 to the destination device 622 is $T_{SEND}=T_{AC}+T_{CD}+T_{WLAN}$, wherein: (i) $T_{AC}$ denotes the time to send the data file 630 from the datastore 612 to the application server 600; (ii) $T_{GA}$ denotes the time to send the data file 630 from the application server 600 to the source device 620; and (iii) $T_{WLAN}$ denotes the time to send the data file 630 from the source device 620 to the destination device 622 over one or more IP networks (e.g., WLAN).

In addition, the time for the data storage system 610 to receive ($T_{RECEIVE}$) the data file 630 from the destination device 622 is $T_{RECEIVE}=T_{DC}\pm T_{CA}$, wherein: (i) $T_{DC}$ denotes the time to send the data file 630 from the destination device 622 to the application server 600; and (ii) $T_{CA}$ denotes the time to send the data file 630 from the application server 600 to the datastore 614 associated with the destination device 622.

The time variables $T_{AC}$, $T_{CD}$, $T_{WLAN}$, $T_{DC}$, and $T_{CA}$ are a function of the size of the data file as follows: $T=T_{fixed}+Size_F*T_{transmission}$, wherein $T_{fixed}$ denotes a sum total of fixed time components such as propagation time, processing time, etc., wherein $T_{transmission}$ denotes a link speed, and wherein $Size_F$ denote a data file size. In this regard, as the size of the data file $Size_F$ increases, the time variables $T_{AC}$, $T_{CD}$, $T_{WLAN}$, $T_{DC}$, and $T_{GA}$ increase, which increases the upload time for sending the data file from the source device 620 to the destination device 622.

As noted above, the storage path optimization module 250 enables optimization of storage path processing in the cloud computing platform 140 by minimizing the upload time for sending data from a source device to a destination device based on the data file size $Size_F$. Indeed, as noted above with reference to FIG. 5, for large data files, a small header file (e.g., notification message) is transmitted over the communications network to a destination device instead of the large data file. Instead, the large data files are transmitted from source LUNs to destinations LUNs in the backend data storage network (e.g., SAN) and accessed by the destination devices upon request. The size of the header file (denoted $Size_H$) is much smaller than the size of the data file, i.e., $Size_H \ll Size_F$, which serves to minimize the data upload time.

For example, FIG. 7 schematically illustrates a method that is implemented under control of an intelligent data management system for sending a data file 730 from the source device 620 to the destination device 622 when a size of the data file 730 exceeds a predefined threshold, according to an embodiment of the invention. In the example of FIG. 7, the source device 620 sends the data file 730 to the application server 600 via an IP communications network link 741. The application server 600 determines that the size of the data file 730 exceeds the predefined threshold, and then accesses the backend data storage system 610 to store the data file 730 in the datastore 612 associated with the source device 620. The data file 730 is transmitted from the application server 600 to the datastore 612 via a data storage network link 742. A copy 730c of the stored data file 730 in the datastore 612 is then written to the datastore 614 associated with the destination device 622. The data file copy 730c is transmitted to the datastore 614 via a data storage network link 743.

Next, the data storage system 610 sends a notification message 732 to the application server 600 via a data storage network link 744 indicating that the data storage operation is complete, and the application server 600 sends a notification message 734 to the destination device 622 via an IP communications network link 745. The notification message 734 notifies the destination device 622 that the data file 730 is available for access. In this embodiment, the upload process is deemed complete when the destination device 622 receives and acknowledges the notification message 734.

FIG. 8 schematically illustrates a method that is implemented under the control of an intelligent data management system for sending a data file from a source device to a destination device when a size of the data file exceeds a predefined threshold, according to another embodiment of the invention. More specifically, FIG. 8 illustrates an embodiment in which a large size data file 830 of the source device 620, which is already stored in the associated datastore 612, is requested to be sent to the destination device 622. In this embodiment, the source device 620 sends a request message 832 to the application server 600 to have the data file 830 sent to the destination device 622. The request message 832 is transmitted to the application server 600 via an IP communications network link 841. The application server 600 sends a corresponding request message 834 to the data storage system 610 to request that a copy of the stored data file 830 be written to the datastore 614 associated with the destination device 622. The request message 834 is transmitted to the data storage system 610 via a data storage network link 842.

In response to the request message 834, a copy 830c of the stored data file 830 in the datastore 612 is written to the datastore 614 associated with the destination device 622. The data file copy 830c is transmitted to the datastore 614 via a data storage network link 843. The data storage system 610 sends a notification message 836 to the application server 600 via a data storage network link 844 indicating that the data storage operation is complete, and the application server 600 sends a notification message 838 to the destination device 622 via an IP communications network link 845. The notification message 838 notifies the destination device 622 that the data file 830 is available for access in the datastore 614 associated with the destination device 622. In this embodiment, the upload process is deemed complete when the destination device 622 receives and acknowledges the notification message 838. The process of FIG. 8 can be repeated to store a copy of the data file 830 in other datastores associated with other destination devices, at the request of the source device 620.

In the example embodiments of FIGS. 7 and 8, the notification messages 732, 734, 736, and 738 and the request messages 832 and 834 are small files/headers with a size ($Size_H$) of a few KBs or less, which effectively decreases the time for uploading data files to destination devices. For example, in the embodiment of FIG. 7, the time to send ($T_{SEND}$) the data file 730 from the source device to the datastore 614 of the destination device is $T_{SEND}=T_{DC}+T_{CA}+T_{SAN}$, wherein: (i) $T_{DC}$ denotes the time to send the data file 730 from the source device 620 to the application server 600; (ii) $T_{CA}$ denotes the time to send the data file 730 from the application server 600 to the datastore 612 associated with the source device 620; and (iii) $T_{SAN}$ denotes the time to send a copy of the data file 730c from the source datastore 612 to the destination datastore 614 over the data storage network link 743 (e.g., SAN link).

In addition, the time for the destination device 622 to receive ($T_{RECEIVE}$) the notification message 734 that the data file 830 is ready for access is $T_{RECEIVE}=T_{AC}\,T_{CD}$, wherein: (i) $T_{AC}$ denotes the time to send the notification message 732 from the data storage system 610 to the application server 600; and (ii) $T_{CD}$ denotes the time to send the notification message 734 from the application server 600 to the destination device 622.

Similarly, in the embodiment of FIG. 8, the time to send ($T_{SEND}$) the data file copy 830c to the datastore 614 of the destination device is $T_{SEND}=T_{DC}+T_{CA}+T_{SAN}$, wherein: (i) $T_{DC}$ denotes the time to send the request message 832 from the source device 620 to the application server 600; (ii) $T_{CA}$ denotes the time to send the request message 834 from the application server 600 to the datastore 612 associated with the source device 620; and (iii) $T_{SAN}$ denotes the time to send a copy of the data file 830c from the source datastore 612 to the destination datastore 614 over the data storage network link 843 (e.g., SAN link).

In addition, the time for the destination device 622 to receive ($T_{RECEIVE}$) the notification message 838 that the data file 830 is ready for access is $T_{RECEIVE}=T_{AC}+T_{CD}$, wherein: (i) $T_{AC}$ denotes the time to send the notification message 836 from the data storage system 610 to the application server 600; and (ii) $T_{CD}$ denotes the time to send the notification message 838 from the application server 600 to the destination device 622.

In the embodiments of FIG. 7, the time variables $T_{DC}$, $T_{CA}$, and $T_{SAN}$ are a function of the size ($Size_F$) of the data file 730 as follows: $T=T_{fixed}\,Size_F*T_{transmission}$, whereas the time variables $T_{AC}$ and $T_{CD}$ are a function of the header file size ($Size_H$) of the notification messages 832 and 834 as follows: $T=T_{fixed}\,Size_H*T_{transmission}$. The variable $T_{fixed}$ denotes a sum total of fixed time components such as propagation time, processing time, etc., and the variable $T_{transmission}$ denotes a link speed.

In this regard, as compared to sending large data files of size $Size_F$, the transmission of small notification messages (e.g., header files of size $Size_H \ll Size_F$) in the embodiments of FIGS. 7 and 8 minimizes the variables TAG and $T_{AC}$ in FIG. 7, and minimizes the variables $T_{DC}$, $T_{CA}$, $T_{AC}$, and $T_{CD}$ in FIG. 8, as such, the overall upload time in FIGS. 7 and 8 is reduced due to the shorter time to transmit small sized messages ($Size_H \ll Sizer$) between the IoT devices 620/622 and the application server 600, and between the application server 600 and the data storage system 610. In addition, the time ($T_{SAN}$) for storing a copy of a data file from a source datastore to a destination datastore over a data storage network (e.g., SAN) is less than the time it takes for transmitting the data file from the source device to the destination device over an IP communications network (e.g., WLAN). Indeed, a SAN is faster than a WLAN and is suited for sending large data files.

In the example embodiments of FIGS. 7 and 8, the time improvement (i.e., decrease in upload time) is proportional to $Size_F$ and a number N of destination devices to which a given data file is uploaded from a source device. In particular, the time improvement can be determined as follows: Time_Improvement=$[(T_{CA}+T_{DC})*(Size_F-Size_H)+(T_{WLAN}-T_{SAN})]*(N-1)$, wherein N is the number of destination devices to which the data file of size $Size_F$ is uploaded.

As demonstrated above, an intelligent data management system can implement the storage path optimization module 250 to manage data storage path processing within the cloud computing platform 140. The storage path optimization module 250 is configured to prevent or defer the transmission of a massive amount of data between devices over a communications network (e.g., the Internet). For example, data is to be sent from a sensor device to another device over the Internet, the storage path optimization module 250 will manage the data (e.g., create a checkpoint, or replicate the data to a corresponding store) at the underlying storage layer of the cloud computing system, and update relevant metadata, such as add a new subscriber, or mark new data ownership, etc. Moreover, the notification messages as discussed above may comprise a small amount of metadata, such as a uniform resource locator (URL) or some pointer-like identifier (e.g., a universally unique identifier (UUID) over the network to a target device, so as to save time, bandwidth and battery. The storage path optimization techniques are advantageously suited for machine-to-machine communication in an IoT ecosystem for various reasons. For example, sensor devices tend to operate as data generators and aggregators, and do not consume or process data instantly—instead, the sensor devices need to store the information for further processing by central servers. In addition, sensor devices are critically constrained devices with regard to energy (battery) and bandwidth, and must minimize the amount of network traffic that the sensor device transmits and receives over a communications network.

Figure 9:
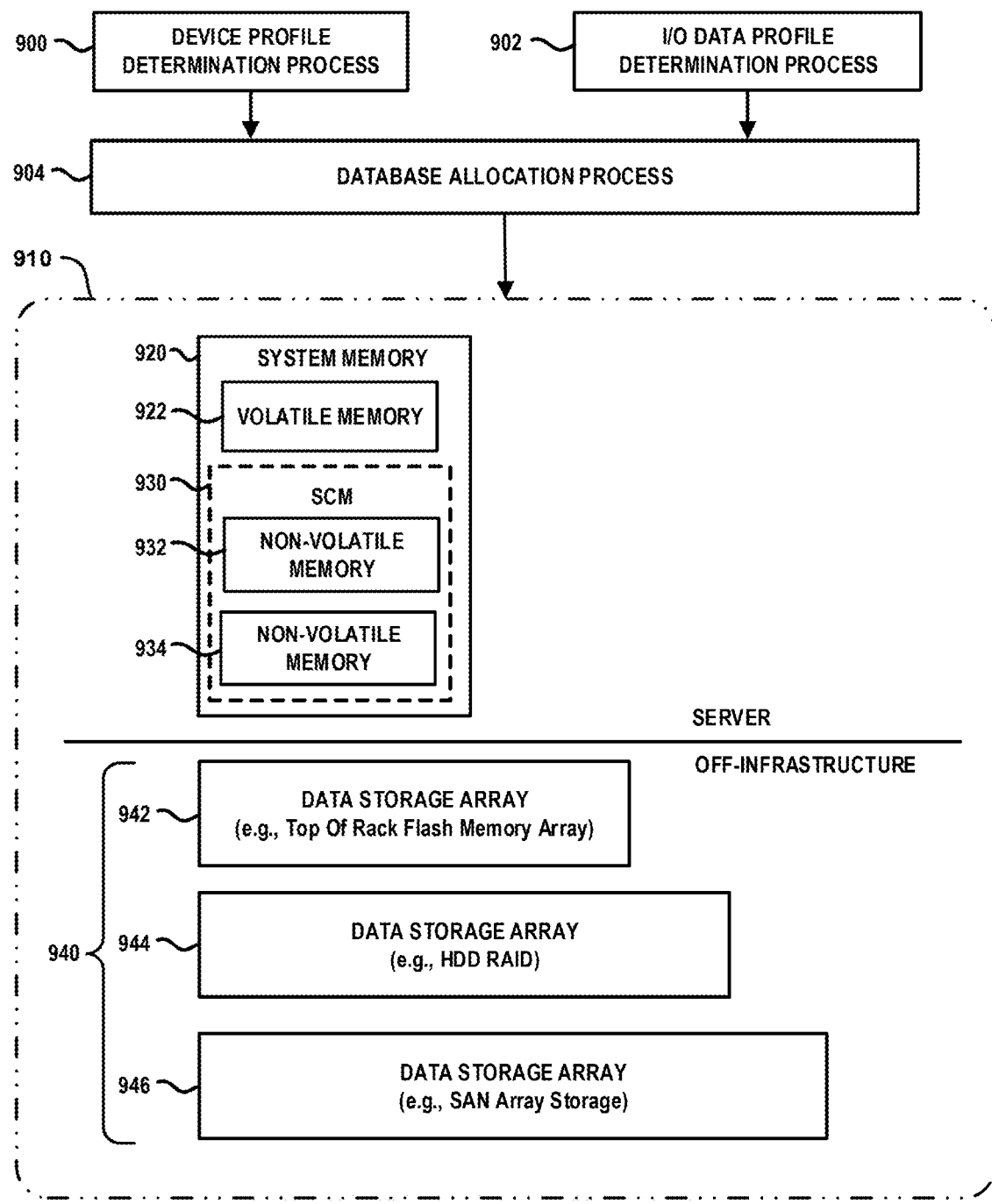
FIG. 9 schematically illustrates a process that is implemented by an intelligent data management system for storing and managing data based on profile information for devices and data access patterns of devices, according to an exemplary embodiment of the invention.

FIG. 9 schematically illustrates a process implemented by an intelligent data management system for storing and managing data based on profile information for devices and data access patterns of devices, according to an exemplary embodiment of the invention. In particular, as shown in FIG. 9, the intelligent data management system implements a device profile determination process 900, an I/O data profile determination process 902, and a database allocation process 904 for storing and managing data in a hierarchical data storage system 910. In some embodiments, the device profile determination process 900 and the I/O data profile determination process 902 are performed by the profiling module 260 (FIG. 2) and the database allocation process 904 is performed by the intelligent database allocation module 270 (FIG. 2).

The hierarchical data storage system 910 comprises a system memory 920 comprising volatile memory 922 and storage-class memory (SCM) 930 comprising a first non-volatile memory 932 and a second non-volatile memory 934, which are accessible as a memory resource. In addition, the hierarchical data storage system 910 comprises a hierarchical tiered storage system 940 comprising a first data storage array 942 (e.g., Tier 0), a second data storage array 944 (e.g., Tier 1) and a third data storage array 946 (e.g., Tier 2). The system memory 920 resides "server side" on the same host server or on different host servers. The hierarchical tiered storage system 940 comprises an "off-host storage infrastructure" which comprises, e.g., network-attached storage (NAS), direct-attached storage (DAS), a storage area network (SAN), etc. The hierarchical tiered storage system 940 of FIG. 9 illustrates an exemplary implementation of the data storage system 190 of FIG. 1, and can be configured to implement the file repositories 280 and the data repositories 290 of FIG. 2.

The system memory 920 can be implemented using a hierarchical memory tier structure wherein the volatile system memory 922 is configured as the highest-level memory tier, and the non-volatile system memories 922 and 924 of the SCM 930 are configured as lower level memory tiers which are utilized as high-speed load/store non-volatile memory devices on a processor memory bus (i.e., data is accessed with loads and stores, instead of with I/O reads and writes). The volatile memory 922 may be a dynamic random-access memory (DRAM) (e.g., DRAM DIMM (Dual In-line Memory Module), or other forms of volatile RAM. The non-volatile memories 932 and 934 may comprise one or more of a NAND Flash storage device, a SSD device, or other types of next generation non-volatile memory (NG-NVM) devices.

In the example embodiment of FIG. 9, the hierarchical tiered storage system 940 comprises three tiers of a tiered storage hierarchy, wherein the first data storage array 942 is configured as the highest-level storage tier, and the third data storage array 946 is configured as the lowest-level storage tier. In general, the lower the number of the tier in a tiered storage hierarchy, the more expensive the storage media and the less time it takes to retrieve data on that tier (i.e., lower data access latency). In one exemplary embodiment, the first data storage array 942 comprises a solid-state storage array (e.g., flash memory array implemented as a "top of rack" flash memory array), the second data storage array 934 comprises DAS devices or NAS servers which implement a HDD RAID storage array, and the third data storage array 946 comprises a SAN array of storage devices.

The device profile determination process 900 implements methods to determine device types and the applications associated with the device types to assign a priority levels to the devices or clusters of devices and associated applications (e.g., high priority, low priority). In some embodiments, the priority level of a given device or cluster of devices and associated application is utilized to determine a memory or storage tier which is suitable to achieve a desired data storage and access performance for IoT data associated with the devices and associated applications. Indeed, certain applications and IoT sensor device monitoring systems that capture and process important data can be accorded high priority.

For example, a water quality monitoring system can be implemented using IoT sensors that are installed in, e.g., pipes, lakes, aquifers, rivers, streams, and other bodies of water that need to be monitored for water quality. In certain applications, there may be a need for real-time monitoring and analysis of water quality (e.g., pH, conductivity/resistivity, oxidation reduction potential, dissolved oxygen, etc.) to determine if and when the water quality is approaching a risky level. As another example, a heartbeat detection and cardiac monitoring system can be implemented using IoT medical sensor devices and associated medical analysis applications to track cardiac conditions of patients. In such instances, there may be a need for real-time monitoring and analysis of the cardiac functions of individuals that have undergone surgery or are known to be at risk for cardiac failure. In such instances, these high priority devices and applications can have data stored in low latency, high performance memory and/or storage tiers.

In other applications, IoT sensor device monitoring systems can capture data that needs to be analyzed in semi-real time or periodically. For example, IoT devices can be used to monitor and capture information regarding point of sale (POS) systems, or track the status of inventory and supply chain assets. In such instances, these such IoT devices and associated applications may be accorded a lower level of priority and stored in lower-performance memory or storage tiers, as the associated data may not need to be continuously accessed and processed in real-time. Instead, such data can be stored for periodic batch processing. In this regard, the intelligent database allocation process 904 can utilize the device profile and priority levels of the IoT devices and associated applications to optimize the storage and management of massive IoT data in the cloud computing platform.

The I/O data profile determination process 902 implements methods that are configured to determine I/O data profiles (e.g., data write and data read patterns) of IoT devices within a IoT device network and other computing devices that access and process the IoT data. For example, some IoT devices primarily transmit more data than receive data, while other IoT devices primarily receive and process more data than transmit data. By way of example, health monitor sensors (which are used for medical applications) or production line sensors (which are used in the oil and gas industry) connected to a network (e.g., the Internet) are more likely to send data (e.g., reports and notifications) to other devices such as mobile phones. To optimize the management of massive IoT data in the cloud computing platform, the intelligent database allocation process 904 can utilize the I/O data profile of IoT devices to store the data in suitable tiers and datastores in the hierarchical framework 910. For example, the data for "send intensive devices can be maintained in a type of storage that is suitable for high read performance such as RAID 5. In addition, the data for "receive-intensive devices" can be maintained in a type of storage that is suitable for high write performance such as RAID 10.

The database allocation process 904 utilizes the profile information that generated by the profile determination processes 900 and 902 to make intelligent memory/storage allocation decisions. Indeed, as noted above, the profiling information allows the database allocation process 904 to determine whether to store data in a target memory tier of the hierarchical memory framework 920, or a target storage tier of the hierarchical storage tier framework 940.

Figure 10:
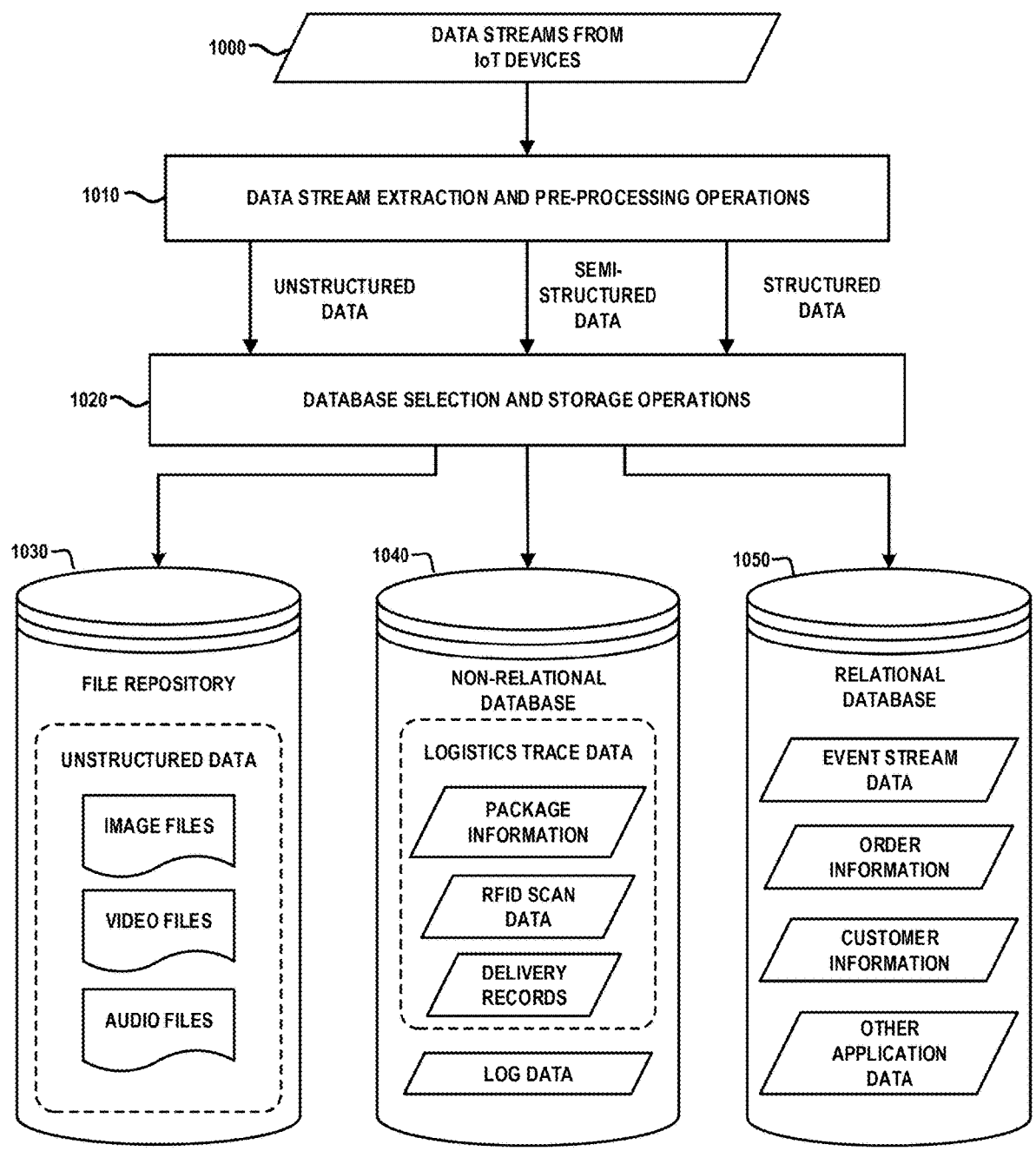
FIG. 10 schematically illustrates a process that is implemented by an intelligent data management system for processing IoT data streams to determine data types and storing the IoT data into selected repositories based on the determined data types, according to an exemplary embodiment of the invention.

FIG. 10 schematically illustrates a process implemented by an intelligent data management system for processing IoT data streams to determine data types and storing the IoT data into selected repositories based on the determined data types, according to an exemplary embodiment of the invention. In particular, as shown in FIG. 10, the intelligent data management system receives data streams 1000 from clusters of IoT devices in one or more IoT device networks. The intelligent data management system performs data stream extraction and data pre-processing operations 1010 and database selection and storage operations 1020. In some embodiments, the data stream extraction and data pre-processing operations 1010 are performed by the pre-data storage preparation module 230 of the intelligent data management system 200 as shown in FIG. 2.

The data stream extraction and pre-processing operations 1010 comprise operations for determining the data types of the received IoT data streams and dividing/partitioning the received IoT data streams according to their determined data types. For example, the IoT data streams are divided according to structured data types, semi-structured data types, and unstructured data types, based on the nature of the data of the received IoT data stream and based on configuration metadata and data models that are predefined by the target application(s) associated with the IoT data streams. The data stream extraction and pre-processing operations 1010 further comprise data pre-processing operations that are performed on the different types of data within the received IoT data streams (e.g., image pre-processing, data summarization, etc.). The database selection and storage operations 1020 are performed to store the partitioned IoT data streams in a target file repository or data repository (e.g., file repository 1030, non-relational database 1040, and relational database 1050) based on the determined data types of the IoT data streams. For example, as noted above, unstructured data is stored in the file repository 1030, semi-structured data and structured data is stored in the non-relational database 1040, and structured data is stored in the relational database 1050.

A logistics delivery system will be described as an illustrative example to show the process flow of FIG. 10. In a logistics delivery environment, each package being delivered is tracked using a series of devices which generate data on a frequent basis. For example, a large number of logistics orders can be traced using IoT devices such as radio-frequency identification (RFID) readers, sensors, and cameras. The data generated by such devices are first collected and pre-processed by certain terminals, and then transmitted to a logistics management application hosted by the cloud computing platform for storage and processing. In accordance with an exemplary embodiment of the invention, the logistics management application would be built to incorporate or otherwise utilize an intelligent data management system as discussed herein to enhance the performance for data storage, processing, and management.

For example, the intelligent data management system would perform database selection and storage operations to store the IoT logistics data in the different repositories 1030, 1040, and 1050 based on the determined data types (e.g., unstructured data, structured data, etc.). For example, as shown in FIG. 10, unstructured data such as image files, video files, audio files, etc., would be stored in the file repository 1030. In addition, structured data and/or semi-structured data such as logistics trace data (e.g., package information, RFID scan data, delivery records, etc.), and log data could be stored in the non-relational database 1040 (e.g., MongoDB). Further, structured data such as event stream data, order information, customer information, and other types of application data would be stored in the relational database 1050 (e.g. My SQL). The structured data could be separately stored in the non-relational and relational databases 1040 and 1050 based on metadata for the given configuration.

Figure 11:
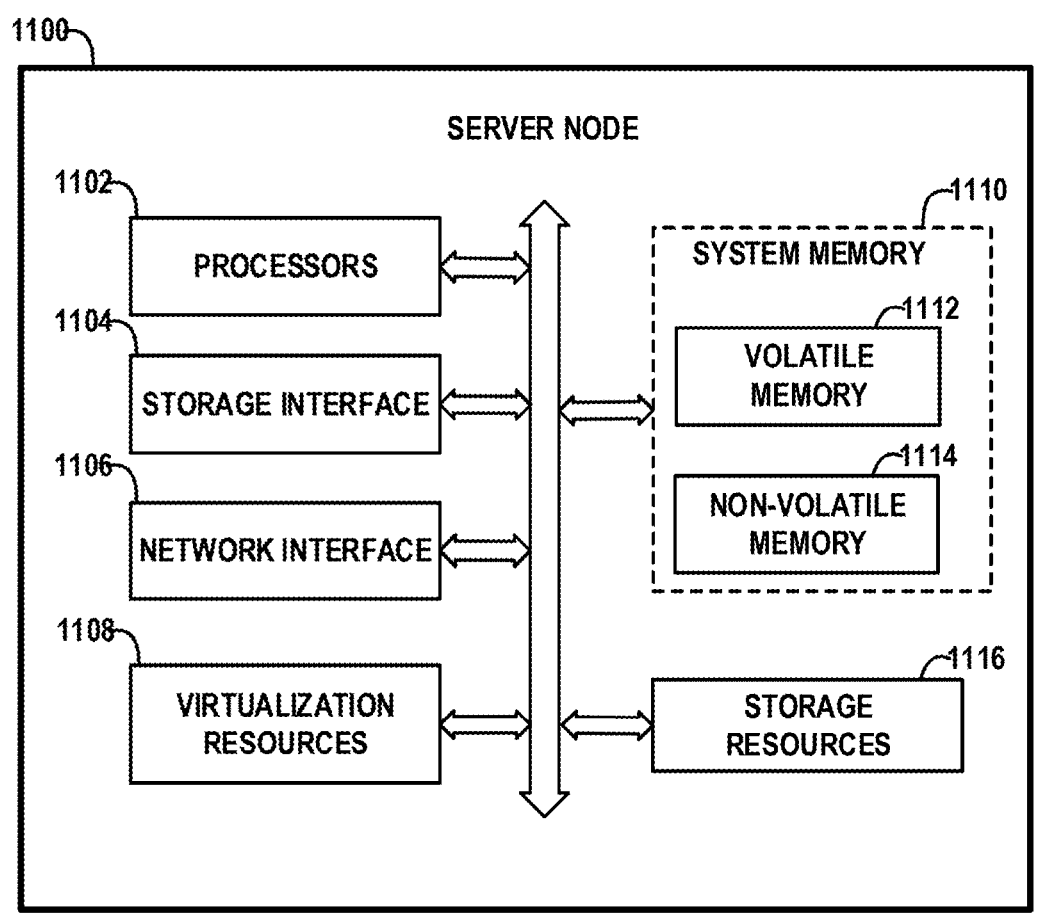
FIG. 11 schematically illustrates framework of a server node for implementing application servers and intelligent data management systems shown in FIGS. 1 and 2.

FIG. 11 schematically illustrates framework of a server node 1100 for implementing the application servers 150 and the intelligent data management systems 170 and 200 of FIGS. 1 and 2. The computing node 1100 comprises processors 1102, storage interface circuitry 1104, network interface circuitry 1106, virtualization resources 1108, system memory 1110, and storage resources 1116. The system memory 1110 comprises volatile memory 1112 and non-volatile memory 1114.

The processors 1102 comprise one or more types of hardware processors that are configured to process program instructions and data to execute a native operating system (OS) and applications that run on the computing node 1100. For example, the processors 1102 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 1104 enables the processors 1102 to interface and communicate with the system memory 1110, the storage resources 1116, and other local storage and off-infrastructure storage media, using one or more standard communication and/or storage control protocols to read data from or write data to volatile and non-volatile memory/storage devices. Such protocols include, but are not limited to, NVMe, PCIe, Parallel ATA (PATA), Serial ATA (SATA), Serial Attached SCSI (SAS), Fibre Channel, etc. The network interface circuitry 1106 enables the server 1100 to interface and communicate with a network and other system components. The network interface circuitry 1106 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 1108 can be instantiated to execute one or more applications or functions which are hosted by the server node 1100. For example, the virtualization resources 1108 can be configured to implement various modules and functionalities of an intelligent data management system as discussed herein. In one embodiment, the virtualization resources 1108 comprise virtual machines that are implemented using a hypervisor platform which executes on the server node 1100, wherein one or more virtual machines can be instantiated to execute functions of the server node 1100. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 1100, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 1108 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 1100 as well as various modules and functionalities of an intelligent data management system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the various modules of the intelligent data management system 200 of FIG. 2 comprise program code that is loaded into the system memory 1110 (e.g., volatile memory 1112), and executed by the processors 1102 to perform respective functions as described herein. In this regard, the system memory 1110 resources, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The system memory 1110 comprises various types of memory such as volatile RAM, NVRAM, or other types of memory, in any combination. The term "memory" or "system memory" as used herein refers to volatile and/or non-volatile memory which is utilized to store application program instructions that are read and processed by the processors 1102 to execute a native operating system and one or more applications or processes hosted by the server node 1100, and to temporarily store data that is utilized and/or generated by the native OS and application programs and processes running on the server node 1100. The storage resources 1116 can include one or more HDDs, SSD storage devices, etc.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system, comprising:
an application server configured to host at least one data processing application;
a distributed data storage system comprising a hierarchical storage system, wherein the hierarchical storage system comprises a tiered system memory comprising at least a first memory tier comprising volatile memory, and a second memory tier comprising non-volatile memory, and a tiered storage system comprising at least a first storage tier and a second storage tier, wherein at least one of the first and second memory tiers and at least one of the first and second storage tiers comprise respective repositories that are configured to store data that is (i) generated by devices of at least one device network, and (ii) processed by the at least one data processing application; and
an intelligent data management system configured to manage data storage operations for storing the data generated by the devices of the at least one device network in the distributed data storage system;
wherein the intelligent data management system is configured to:
receive data generated by a given device of the at least one device network;
determine one or more data types of the received data;
determine a priority level of the given device based on at least one of a device type of the given device, and an application type of the at least one data processing application which processes the data generated by the given device; and
select at least one of the repositories within at least one of the first and second memory tiers and the first and second storage tiers of the hierarchical storage system to store the received data based at least in part on the determined one or more data types of the received data and the determined priority level of the given device; and
wherein the intelligent data management system is further configured to:
determine data write patterns and data read patterns of the devices of the at least one device network; and
utilize the determined data write patterns and data read patterns to store the data of the devices in locations within the distributed data storage system to increase a throughput of data read and data write operations for the devices of the at least one device network.

2. The system of claim 1, wherein the respective repositories comprise a file repository and a data repository, and wherein the intelligent data management system is configured to determine unstructured data types and structured data types, and store data which is determined to have an unstructured data type in the file repository and store data which is determined to have a structured data type in the data repository.

3. The system of claim 2, wherein the data repository comprises one or more of a relational database and a non-relational database.

4. The system of claim 1, wherein the intelligent data management system is configured to determine device types of the devices of the at least one device network, and assign respective priority levels to the devices based at least in part on the respective determined device types of the devices and the application type of the at least one data processing application.

5. The system of claim 1, wherein the intelligent data management system is configured to allocate one or more virtual machines or application servers to the devices of the at least one device network based on respective device types of the devices.

6. The system of claim 1, wherein the intelligent data management system is configured to perform one or more pre-processing operations on the data generated by the devices of the at least one device network before storing the data in the distributed data storage system.

7. The system of claim 1, wherein the system comprises an Internet-of-Things cloud computing system.

8. The system of claim 1, wherein the devices of the at least one device network comprise sensor devices which generate sensor data.

9. A method comprising:
configuring an application server to host at least one data processing application;
configuring a distributed data storage system to comprise a hierarchical storage system, wherein the hierarchical storage system comprises a tiered system memory comprising at least a first memory tier comprising volatile memory, and a second memory tier comprising non-volatile memory, and a tiered storage system comprising at least a first storage tier and a second storage tier, wherein at least one of the first and second memory tiers and at least one of the first and second storage tiers comprise respective repositories that are configured to store data that is (i) generated by devices of at least one device network, and (ii) processed by the at least one data processing application;
configuring an intelligent data management system to manage data storage operations for storing the data generated by the devices of the at least one device network in the distributed data storage system by performing a process which comprises:
receiving, by the intelligent data management system, data generated by a given device of the at least one device network;
determining, by the intelligent data management system, one or more data types of the received data;
determining, by the intelligent data management system, a priority level of the given device based on at least one of a device type of the given device, and an application type of the at least one data processing application which processes the data generated by the given device; and
selecting, by the intelligent data management system, at least one of the repositories within at least one of the first and second memory tiers and the first and second storage tiers of the hierarchical storage system to store the received data based at least in part on the determined one or more data types of the received data and the determined priority level of the given device; and
configuring the intelligent data management system to perform a process which comprises:
determining, by the intelligent data management system, data write patterns and data read patterns of the devices of the at least one device network; and
utilizing, by the intelligent data management system, the determined data write patterns and data read patterns to store the data of the devices in locations within the distributed data storage system to increase a throughput of data read and data write operations for the devices of the at least one device network.

10. The method of claim 9, wherein the respective repositories comprise a file repository and a data repository, wherein determining one or more data types of the data generated by the network of devices comprises determining unstructured data types and structured data types.

11. The method of claim 10, comprising:
storing data which is determined to have an unstructured data type in the file repository; and
storing data which is determined to have a structured data type in the data repository.

12. The method of claim 10, wherein the data repository comprises one or more of a relational database and a non-relational database.

13. The method of claim 9, further comprising:
determining, by the intelligent data management system, device types of the devices of the at least one device network; and
assigning, by the intelligent data management system, respective priority levels to the devices based at least in part on the respective determined device types of the devices and the application type of the at least one data processing application.

14. The method of claim 9, further comprising allocating, by the intelligent data management system, one or more virtual machines or application servers to the devices of the at least one device network based on respective device types of the devices.

15. The method of claim 9, further comprising performing, by the intelligent data management system, one or more pre-processing operations on the data generated by the devices of the at least one device network before storing the data in the distributed data storage system.

16. An article of manufacture comprising a non-transitory processor-readable storage medium having stored therein program code of one or more software programs, wherein the program code is executable by one or more processors to:
configure an application server to host at least one data processing application;
configure a distributed data storage system to comprise a hierarchical storage system, wherein the hierarchical storage system comprises a tiered system memory comprising at least a first memory tier comprising volatile memory, and a second memory tier comprising non-volatile memory, and a tiered storage system comprising at least a first storage tier and a second storage tier, wherein at least one of the first and second memory tiers and at least one of the first and second storage tiers comprise respective repositories that are configured to store data that is (i) generated by devices of at least one device network, and (ii) processed by the at least one data processing application; and
configure an intelligent data management system to manage data storage operations for storing the data generated by the devices of the at least one device network in the distributed data storage system, wherein the intelligent data management system is configured to:
receive data generated by a given device of the at least one device network;
determine one or more data types of the received data;
determine a priority level of the given device based on at least one of a device type of the given device, and an application type of the at least one data processing application which processes the data generated by the given device; and
select at least one of the repositories within at least one of the first and second memory tiers and the first and second storage tiers of the hierarchical storage system to store the received data based at least in part on the determined one or more data types of the received data and the determined priority level of the given device; and
wherein the intelligent data management system is further configured to:
determine data write patterns and data read patterns of the devices of the at least one device network; and
utilize the determined data write patterns and data read patterns to store the data of the devices in locations within the distributed data storage system to increase a throughput of data read and data write operations for the devices of the at least one device network.

17. The article of manufacture of claim 16, wherein the respective repositories comprise a file repository and a data repository, wherein the intelligent data management system is configured to:
determine unstructured data types and structured data types;
store data which is determined to have an unstructured data type in the file repository; and
store data which is determined to have a structured data type in the data repository.

18. The article of manufacture of claim 16, wherein the program code is further executable by the one or more processors to configure the intelligent data management system to:
determine device types of the devices of the at least one device network; and
assign respective priority levels to the devices based at least in part on the respective determined device types of the devices and the application type of the at least one data processing application.

19. The method of claim 9, wherein the at least one device network comprises an Internet-of-Things network, and the devices of the at least one device network comprise sensor devices which generate sensor data.

20. The article of manufacture of claim 16, wherein the at least one device network comprises an Internet-of-Things network, and the devices of the at least one device network comprise sensor devices which generate sensor data.

* * * * *